US006662097B2

(12) United States Patent
Kin et al.

(10) Patent No.: US 6,662,097 B2
(45) Date of Patent: Dec. 9, 2003

(54) SYSTEM FOR COMPUTING A ROAD SURFACE FRICTIONAL COEFFICIENT

(75) Inventors: Keiyu Kin, Wako (JP); Hiroyuki Urabe, Wako (JP); Osamu Yano, Tochigi (JP)

(73) Assignee: Honda Giken Kogyo KabushikiKaisha, Tokyo (JP)

( * ) Notice: Subject to any disclaimer, the term of this patent is extended or adjusted under 35 U.S.C. 154(b) by 0 days.

(21) Appl. No.: 10/244,322

(22) Filed: Sep. 16, 2002

(65) Prior Publication Data

US 2003/0074127 A1 Apr. 17, 2003

(30) Foreign Application Priority Data

Oct. 11, 2001 (JP) ........................................ 2001-314521

(51) Int. Cl.[7] .............................................. G06F 19/00
(52) U.S. Cl. .............................. 701/80; 701/70; 73/105; 73/146
(58) Field of Search ........................ 701/70, 80; 73/104, 73/105, 146

(56) References Cited

U.S. PATENT DOCUMENTS 5,671,143 A * 9/1997 Graber ........................ 701/72
5,747,682 A * 5/1998 Hirano ....................... 73/118.1
6,473,682 B1 * 10/2002 Nakamura ................... 701/74
6,549,842 B1 * 4/2003 Hac et al. ................... 701/80

* cited by examiner

Primary Examiner—Gary Chin
(74) Attorney, Agent, or Firm—Fish & Richardson PC

(57) ABSTRACT

In a system for computing a road surface frictional coefficient for controlling a motion of a vehicle, the road surface frictional coefficient is estimated according to the deviation of the estimated vehicle body fore-and-aft/lateral acceleration from the actually detected vehicle body fore-and-aft/lateral acceleration, instead of estimating it directly from the tire slip ratio so that the road surface frictional coefficient is prevented from being estimated substantially higher than it actually is. In particular, by judging a sudden change in the road surface frictional coefficient only when a change in the road surface frictional coefficient, in particular an increase in the frictional coefficient, has persisted for more than a prescribed time period, an error in the estimation of the road surface frictional coefficient can be minimized, and a favorable vehicle motion control based on the estimated road surface frictional coefficient can be ensured under all conditions.

2 Claims, 15 Drawing Sheets

SYSTEM FOR COMPUTING A ROAD SURFACE FRICTIONAL COEFFICIENT

TECHNICAL FIELD

The present invention relates to a system for computing a road surface frictional coefficient according to output values of a vehicle body lateral acceleration and a vehicle body fore-and-aft acceleration when tire are slipping.

BACKGROUND OF THE INVENTION

According to a conventional system for computing a road surface frictional coefficient, output values of a vehicle body lateral acceleration and a vehicle body fore-and-aft acceleration when tire are slipping are detected, and the road surface frictional coefficient is computed from these detected values.

However, according to such a conventional method, the road surface frictional coefficient cannot be updated according to the change in the condition of the road surface unless the tire slip ratio gets greater than a certain level. For instance, when the tire grip force is relative small on a low frictional coefficient road such as a snow-covered road and frozen road, the tire slip ratio is so small that the road surface frictional coefficient tends to be estimated higher than actually is.

BRIEF SUMMARY OF THE INVENTION

In view of such problems of the prior art, a primary object of the present invention is to provide a system for computing a road surface frictional coefficient which is free from such problems of the prior art.

A second object of the present invention is to provide a system for computing a road surface frictional coefficient which provides an accurate value under all conditions.

According to the present invention, these and other objects of the present invention can be accomplished by providing a system for computing a road surface frictional coefficient for controlling a motion of a vehicle, comprising: a vehicle body fore-and-aft acceleration sensor for detecting a vehicle body fore-and-aft acceleration; a vehicle body lateral acceleration sensor for detecting a vehicle body lateral acceleration; a wheel speed sensor for detecting a road wheel speed; a vehicle body speed estimating unit for computing a vehicle body speed according to the wheel speed; a tire slip ratio computing unit for computing a tire slip ratio according to the vehicle body speed and wheel speed; a tire model defining unit for defining a dynamic tire model; a tire fore-and-aft force computing unit for computing tire fore-and-aft force according to the tire slip ratio and tire model; an estimated vehicle body fore-and-aft acceleration computing unit for estimating the vehicle body fore-and-aft acceleration according to the tire fore-and-aft force; a tire lateral force computing unit for computing a tire lateral force according to the tire slip ratio and tire model; an estimated vehicle body lateral acceleration computing unit for estimating the vehicle body lateral acceleration according to the tire lateral force; and a road surface frictional coefficient computing unit for computing a road surface frictional coefficient according to at least one of a result of comparison between the detected vehicle body fore-and-aft acceleration and estimated vehicle body fore-and-aft acceleration, and a result of comparison between the detected vehicle body lateral acceleration and estimated vehicle body lateral acceleration.

Thus, the road surface frictional coefficient is estimated according to the deviation of the estimated vehicle body fore-and-aft/lateral acceleration from the actually detected vehicle body fore-and-aft/lateral acceleration, instead of estimating it directly from the tire slip ratio so that the road surface frictional coefficient is prevented from being estimated substantially higher than it actually is. In particular, by judging a sudden change in the road surface frictional coefficient only when a change in the road surface frictional coefficient, in particular an increase in the frictional coefficient, has persisted for more than a prescribed time period, an error in the estimation of the road surface frictional coefficient can be minimized, and a favorable vehicle motion control based on the estimated road surface frictional coefficient can be ensured under all conditions.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
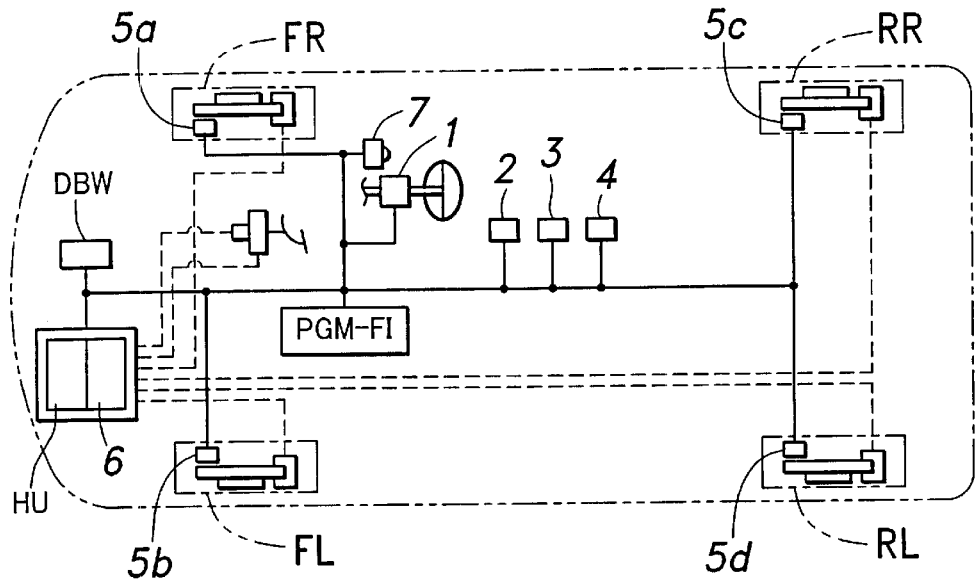
FIG. 1 is a diagram showing the overall structure of the vehicle motion control system embodying the present invention.

FIG. 1 is an overall system diagram of an automobile to which the present invention is applied. This vehicle is fitted with a steering device for steering the front wheels FR and FL which is provided with a steering sensor 1. A yaw rate sensor 2, lateral acceleration sensor 3 and fore-and-aft acceleration sensor 4 are placed in appropriate locations of the vehicle body. Each of the wheels FR, FL, RR and RL is provided with a wheel speed sensor 5a, 5b, 5c and 5d for measuring the rotational speed of the corresponding wheel. These sensors are connected to a central control unit 6. The central control unit 6 is incorporated with a brake hydraulic pressure control actuator HU for controlling the braking force of each individual wheel, and is connected to an electronic throttle controller DBW for controlling the opening degree of the engine throttle valve and a PGM-FI controller for controlling the fuel injection and ignition timing of the engine. The central control unit 6 is connected to a monitor 7 to allow the status of the central control unit 6 to be visually displayed.

Figure 2:
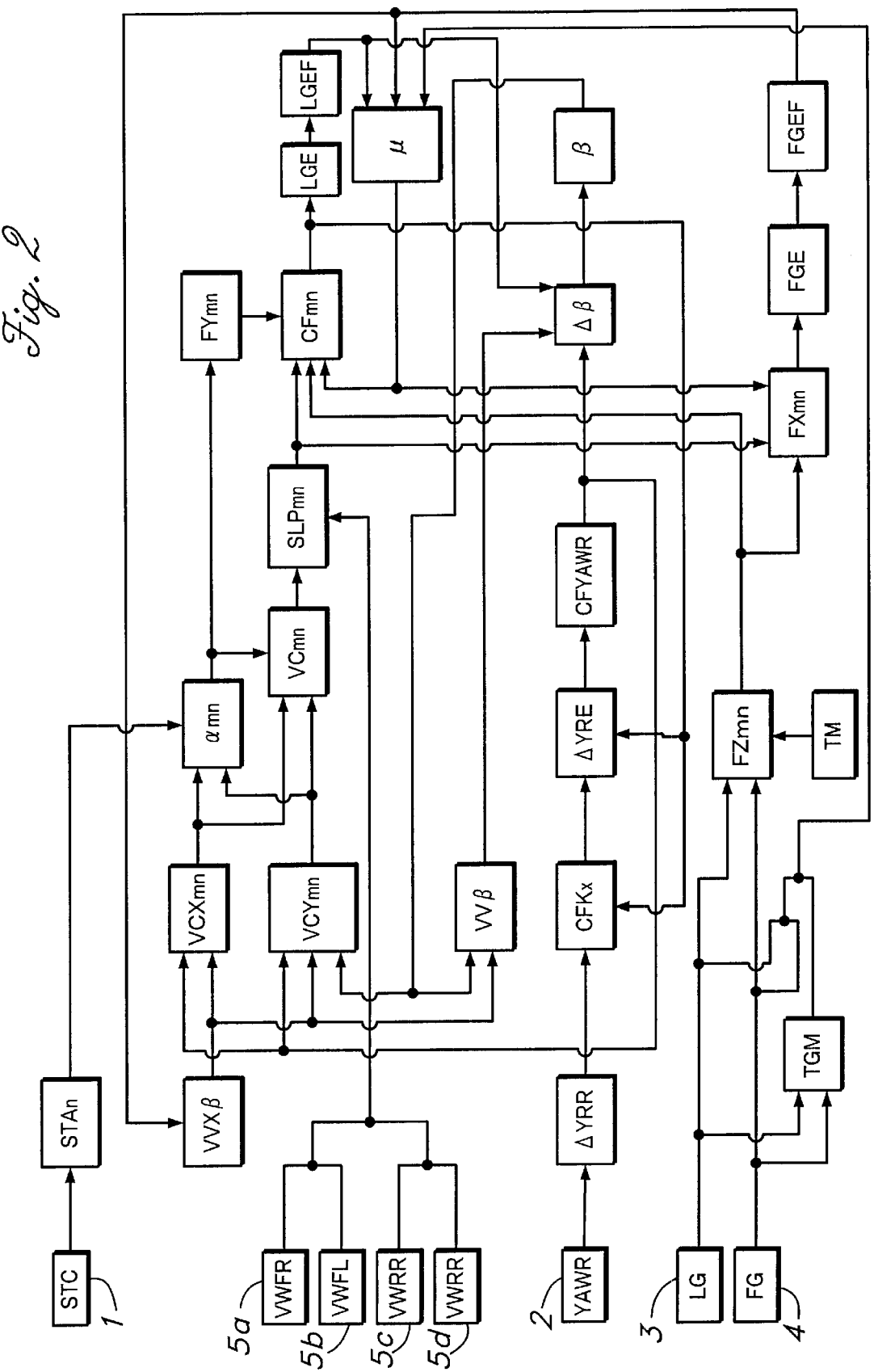
FIG. 2 is a block diagram showing the estimation logic for various control values.

FIG. 2 is a block diagram showing the estimation logic for various control variables used in the central control unit 6 embodying the present invention. In the illustrated embodiment, the values detected by the various sensors 1–4 and 5a–5d are used for determining the control variables that are needed to execute a vehicle motion control according to the present invention. This vehicle motion control is of such a kind that can achieve both a high stability and a favorable steerability, and can be extended for the use of rear wheel drive vehicles and four wheel drive vehicles as well as front wheel drive vehicles. It is essential for this vehicle motion control that the slippage of the four wheels are optimally controlled, and it is accomplished by using a four wheel brake actuator which can control the braking force of each individual wheel.

Figure 3:
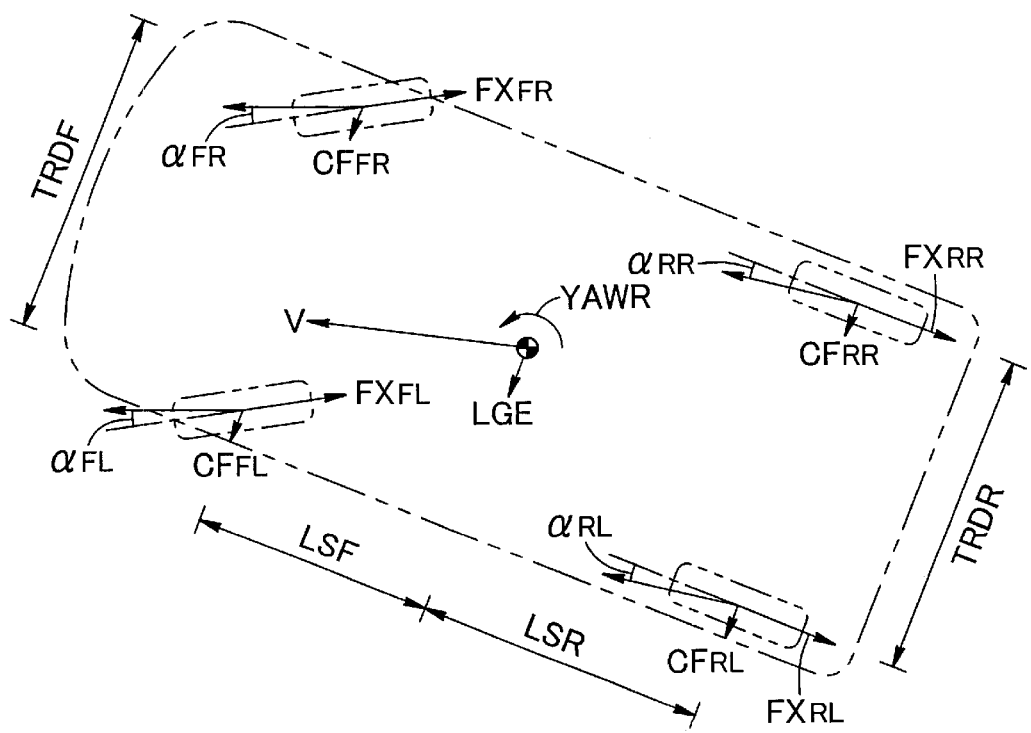
FIG. 3 is a diagram showing the definition of tire slip angles, tire lateral forces, vehicle body lateral acceleration, tire fore-and-aft forces and yawing motion of a vehicle turning a corner.

As shown in FIG. 3, the variables that are needed for this control during cornering include tire slip angles $\alpha_{FR}$, $\alpha_{FL}$, $\alpha_{RR}$ and $\alpha_{RL}$, tire lateral forces $CF_{FR}$, $CF_{FL}$, $CF_{RR}$ and $CF_{RL}$, a vehicle body lateral acceleration LGE, and tire fore-and-aft forces or brake/traction forces $FX_{FR}$, $FX_{FL}$, $FX_{RR}$ and $FX_{RL}$. A road frictional coefficient between the tire and road surface is necessary for determining a fore-and-aft acceleration FGE as well as the brake/traction forces and tire lateral forces.

The steering angle sensor 1 determines a steering angle STC, the wheel speed sensors 5a–5d determine the wheel speeds $VW_{FR}$, $VW_{FL}$, $VW_{RR}$ and $VW_{RL}$, the yaw rate sensor 2 determines the yaw rate YAWR, the lateral acceleration sensor 3 determines the vehicle body lateral acceleration LG, and the fore-and-aft acceleration sensor 4 determines the vehicle body fore-and-aft acceleration FG.

The steering angle STC is forwarded to an actual tire steering angle computing unit $STA_n$, and the actual tire steering angles $STA_R$ and $STA_L$ of the right and left front wheels are forwarded to a tire slip angle computing unit $\alpha_{mn}$. The wheel speeds $VW_{FR}$, $VW_{FL}$, $VW_{RR}$ and $VW_{RL}$ are forwarded to a tire slip ratio computing unit $SLP_{mn}$, the yaw rate YAWR is forwarded to an actual yaw rate increment computing unit $\Delta$YRR, and the vehicle body accelerations LG and FR are forwarded to a wheel load computing unit $FZ_{mn}$.

In the illustrated embodiment, the wheel load computing unit $FZ_{mn}$ computes wheel loads $FZ_{FR}$, $FZ_{FL}$, $FZ_{RR}$ and $FZ_{RL}$ according to a dynamic tire model TM and the vehicle body accelerations LG and FR. The values produced from the wheel load computing unit $FZ_{mn}$ are forwarded to a tire lateral force (cornering force) computing unit $CF_{mn}$ and a tire fore-and-aft force computing unit $FX_{mn}$. Other methods may also be used for computing the wheel loads, for instance by actually measuring the vertical loads of the individual wheels.

The tire fore-and-aft force computing unit $FX_{mn}$ computes the brake/traction forces $FX_{FR}$, $FX_{FL}$, $FX_{RR}$ and $FX_{RL}$ of the individual wheels according to the wheel loads obtained from the wheel load computing unit $FZ_{mn}$, the tire slip ratios $SLP_{FR}$, $SLP_{FL}$, $SLP_{RR}$ and $SLP_{RL}$ of the individual wheels obtained from the tire slip ratio computing unit $SLP_{mn}$, and the road frictional coefficient $\mu$ which is computed by a road surface frictional coefficient computing unit $\mu$. The various values produced from the tire fore-and-aft force computing unit $FX_{mn}$ are forwarded to an estimated fore-and-aft acceleration computing unit FGE which then produces an estimated fore-and-aft acceleration FGE according to the brake/traction forces $FX_{FR}$, $FX_{FL}$, $FX_{RR}$ and $FX_{RL}$. The estimated fore-and-aft acceleration FGE is filtered by an estimated fore-and-aft acceleration filter FGEF. The filtered estimated fore-and-aft acceleration FGEF is then forwarded to the road surface frictional coefficient computing unit $\mu$.

The filtered estimated fore-and-aft acceleration FGEF is also forwarded to an estimated vehicle body speed (X-component) computing unit VVXβ which then computes an estimated vehicle body speed (X-component) VVXβ or a fore-and-aft speed of the vehicle body. The estimated vehicle body speed (X-component) VVXβ is then forwarded to a contact point speed (X-component) computing unit $VCX_{mn}$.

The contact point speed (X-component) computing unit $VCX_{mn}$ receives an estimated yaw rate CFYAWR from an estimated yaw rate computing unit CFYAWR which is described hereinafter in addition to the estimated vehicle body speed (X-component) VVXβ. The contact point speed (X-component) computing unit $VCX_{mn}$ produces contact point speeds (X-component) $VCX_{FR}$, $VCX_{FL}$, $VCX_{RR}$ and $VCX_{RL}$ as estimated fore-and-aft wheel speeds of the individual wheels. The contact point speeds (X-component) may correspond to the fore-and-aft vehicle body speed at the contact points of the individual wheels.

The estimated vehicle body speed (X-component) VVXβ and estimated yaw rate CFYAWR are also forwarded to a contact point speed (Y-component) computing unit $VCY_{mn}$ which additionally receives a vehicle body slip angle β from a vehicle body slip angle computing unit β, in addition to the estimated vehicle body speed (X-component) VVXβ and estimated yaw rate CFYAWR, to compute contact point speeds (Y-component) $VCY_{FR}$, $VCY_{FL}$, $VCY_{RR}$ and $VCY_{RL}$ as estimated lateral wheel speeds of the individual wheels. The contact point speeds (Y-component) may correspond to the lateral body speed at the contact points of the individual wheels.

The various values produced from the contact point speed (X-component) computing unit $VCX_{mn}$ are forwarded to the tire slip angle computing unit $\alpha_{mn}$ and a rolling direction speed computing unit $VC_{mn}$. The various values produced from the contact point speed (Y-component) computing unit $VCY_{mn}$ are also forwarded to the tire slip angle computing unit $\alpha_{mn}$ and rolling direction speed computing unit $VC_{mn}$. In the illustrated embodiment, the tire slip angles $\alpha_{FR}$, $\alpha_{FL}$, $\alpha_{RR}$ and $\alpha_{RL}$ of the individual wheels are computed according to the actual tire steering angle $STA_n$, contact point speeds (X-component) $VCX_{FR}$, $VCX_{FL}$, $VCX_{RR}$ and $VCX_{RL}$, and contact point speeds (Y-component) $VCY_{FR}$, $VCY_{FL}$, $VCY_{RR}$ and $VCY_{RL}$ of the individual wheels, and are forwarded to the tire cornering force computing unit $FY_{mn}$ and rolling direction speed computing unit $VC_{mn}$. The tire slip angles may also be determined by using other methods.

The rolling direction speed computing unit $VC_{mn}$ computes rolling direction speeds $VC_{FR}$, $VC_{FL}$, $VC_{RR}$ and $VC_{RL}$ of the individual wheels according to the tire slip angles obtained from the tire slip angle computing unit $\alpha_{mn}$ and the values obtained from the contact point speed (X-component) computing unit $VCX_{mn}$ and contact point speed (Y-component) computing unit $VCY_{mn}$. In the illustrated embodiment, the various values produced from the rolling direction speed computing unit $VC_{mn}$ are forwarded to the slip ratio computing unit $SLP_{mn}$ which then computes the slip ratios $SLP_{FR}$, $SLP_{FL}$, $SLP_{RR}$ and $SLP_{RL}$ of the individual wheels according to the rolling direction speeds $VC_{FR}$, $VC_{FL}$, $VC_{RR}$ and $VC_{RL}$ and wheel speeds $VW_{FR}$, $VW_{FL}$, $VW_{RR}$ and $VW_{RL}$. The slip ratios may also be determined by using other methods.

The tire slip angles obtained from the tire slip angle computing unit $\alpha_{mn}$ are also supplied to the cornering force computing unit $FY_{mn}$ which computes the cornering forces $FY_{FR}$, $FY_{FL}$, $FY_{RR}$ and $FY_{RL}$ of the individual wheels according to the tire slip angles. The cornering forces that are produced from the cornering force computing unit $FY_{mn}$ are forwarded to the tire lateral force (cornering force) computing unit $CF_{mn}$.

The tire lateral force (cornering force) computing unit $CF_{mn}$ receives the slip ratios from the slip ratio computing unit $SLP_{mn}$, the wheel loads from the wheel load computing unit $FZ_{mn}$, and the road frictional coefficient $\mu$ from the road surface frictional coefficient computing unit $\mu$, in addition to the cornering forces, and computes the tire lateral forces $CF_{FR}$, $CF_{FL}$, $CF_{RR}$ and $CF_{RL}$ of the individual wheels according to these variables. The output from the tire lateral force (cornering force) computing unit $CF_{mn}$ is forwarded to an estimated lateral acceleration computing unit LGE. The estimated lateral acceleration computing unit LGE computes an estimated lateral acceleration LGE according to the tire lateral forces obtained from the tire lateral force (cornering force) computing unit $CF_{mn}$. The estimated lateral acceleration LGE is filtered by an estimated acceleration filter LGEF, and is then forwarded to the aforementioned road surface frictional coefficient computing unit $\mu$.

A tire grip force computing unit TGM computes a total grip force RTGM according to the vehicle body lateral acceleration LG and vehicle body fore-and-aft acceleration FG. The obtained total grip force RTGM, along with the outputs of the acceleration sensors LG and FG, is forwarded to the road surface frictional coefficient computing unit $\mu$. The total grip force RTGM is computed as a square root of the sum of the square of the vehicle body lateral acceleration LG and the square of the vehicle body fore-and-aft acceleration FG, or $\{(FG^2+LG^2)^{1/2}\}$.

The actual yaw rate increment computing unit $\Delta$YRR computes an actual yaw rate increment $\Delta$YRR according to the yaw rate sensor value YAWR, and the computed actual yaw rate increment $\Delta$YRR is then forwarded to a front and rear wheel moment correction coefficient computing unit $CFK_X$. The front and rear wheel moment correction coefficient computing unit $CFK_X$ also receives the tire lateral forces from the tire lateral force computing unit $CF_{mn}$, in addition to the computed actual yaw rate increment $\Delta$YRR, and computes a front and rear wheel moment correction coefficient CFK1 and CFK2 according to these variables. The front and rear wheel moment correction coefficients CFK1 and CFK2 are forwarded to an estimated yaw rate increment computing unit $\Delta$YRE.

The estimated yaw rate increment computing unit $\Delta$YRE receives the tire lateral forces from the tire lateral force computing unit $CF_{mn}$, in addition to the front and rear wheel moment correction coefficients CFK1 and CFK2, and computes an estimated yaw rate increment $\Delta$YRE according to these variables. The estimated yaw rate increment $\Delta$YRE is forwarded to an estimated yaw rate computing unit CFYAWR.

The estimated yaw rate computing unit CFYAWR computes an estimated yaw rate CFYAWR according to the estimated yaw rate increment $\Delta$YRE. The estimated yaw rate CFYAWR is forwarded to the contact point speed (X-component) computing unit $VCX_{mn}$ and contact point speed (Y-component) computing unit $VCY_{mn}$ as well as to a vehicle body slip angle increment computing unit $\Delta\beta$.

An estimated vehicle body speed computing unit $VV\beta$ computes an estimated vehicle body speed $VV\beta$ according to the estimated vehicle body speed (X-component) $VVX\beta$ and vehicle body slip angle $\beta$. The estimated vehicle body speed $VV\beta$, estimated yaw rate CFYAWR and filtered estimated acceleration LGEF are forwarded to the vehicle body slip angle increment computing unit $\Delta\beta$. According to these values, the vehicle body slip angle increment computing unit $\Delta\beta$ computes a vehicle body slip angle increment $\Delta\beta$. The vehicle body slip angle computing unit $\beta$ then computes a vehicle body slip angle $\beta$ according to the vehicle body slip angle increment $\Delta\beta$. The vehicle body slip angle may also be determined by using other methods.

Figure 4:
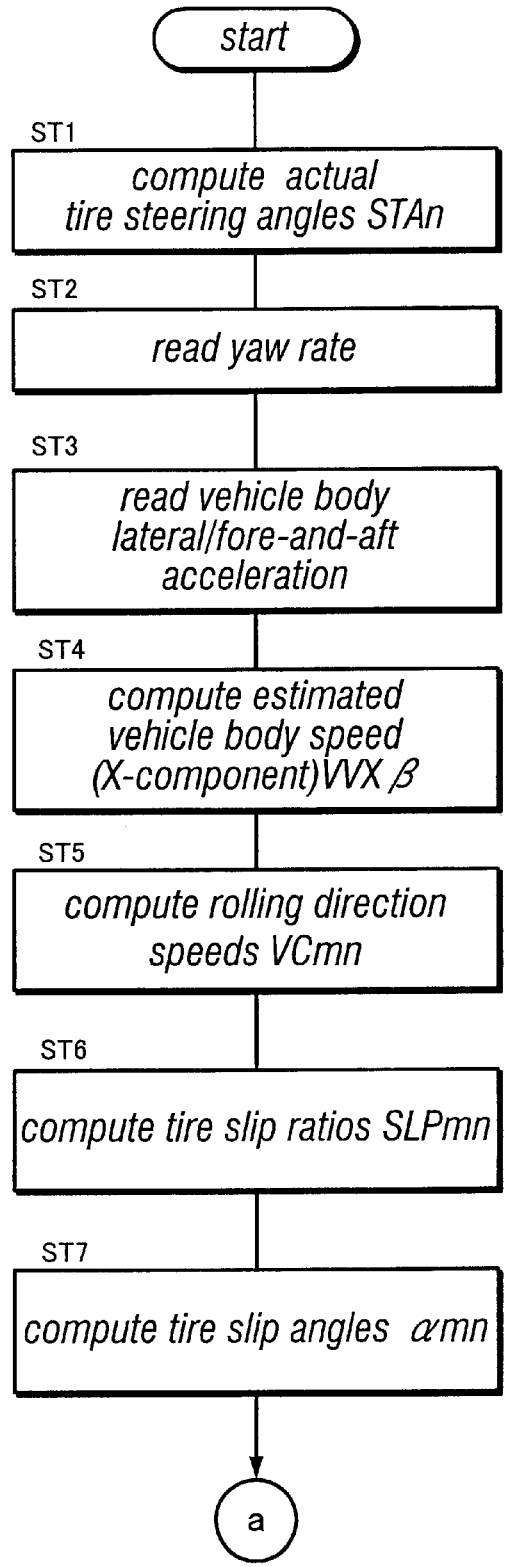
FIG. 4 is a first part of a general flow chart of the control process in the vehicle motion control system.

The control process which is executed in this control unit is now described in the following with reference to the flow chart of FIG. 4.

In step ST1, the actual tire steering angle computing unit $STA_n$ receives a steering angle STC from the steering sensor, and determines the actual tire steering angles $STA_R$ and $STA_L$ by taking into account various design parameters such as the gear ratio of the steering gear box. In step ST2, a yaw rate YAWR is read out from the yaw rate sensor YAWR. In step ST3, a vehicle body lateral acceleration LG and vehicle body fore-and-aft acceleration FG are read out from the acceleration sensors LG and FG before the control flow advances to step ST4.

In step ST4, the estimated vehicle body speed computing unit $VV\beta$ computes an estimated vehicle body speed (X-component) $VVX\beta$. The computation of the estimated vehicle body speed (X-component) $VVX\beta$ may be carried out as shown in the flow chart shown in FIG. 5.

Figure 5:
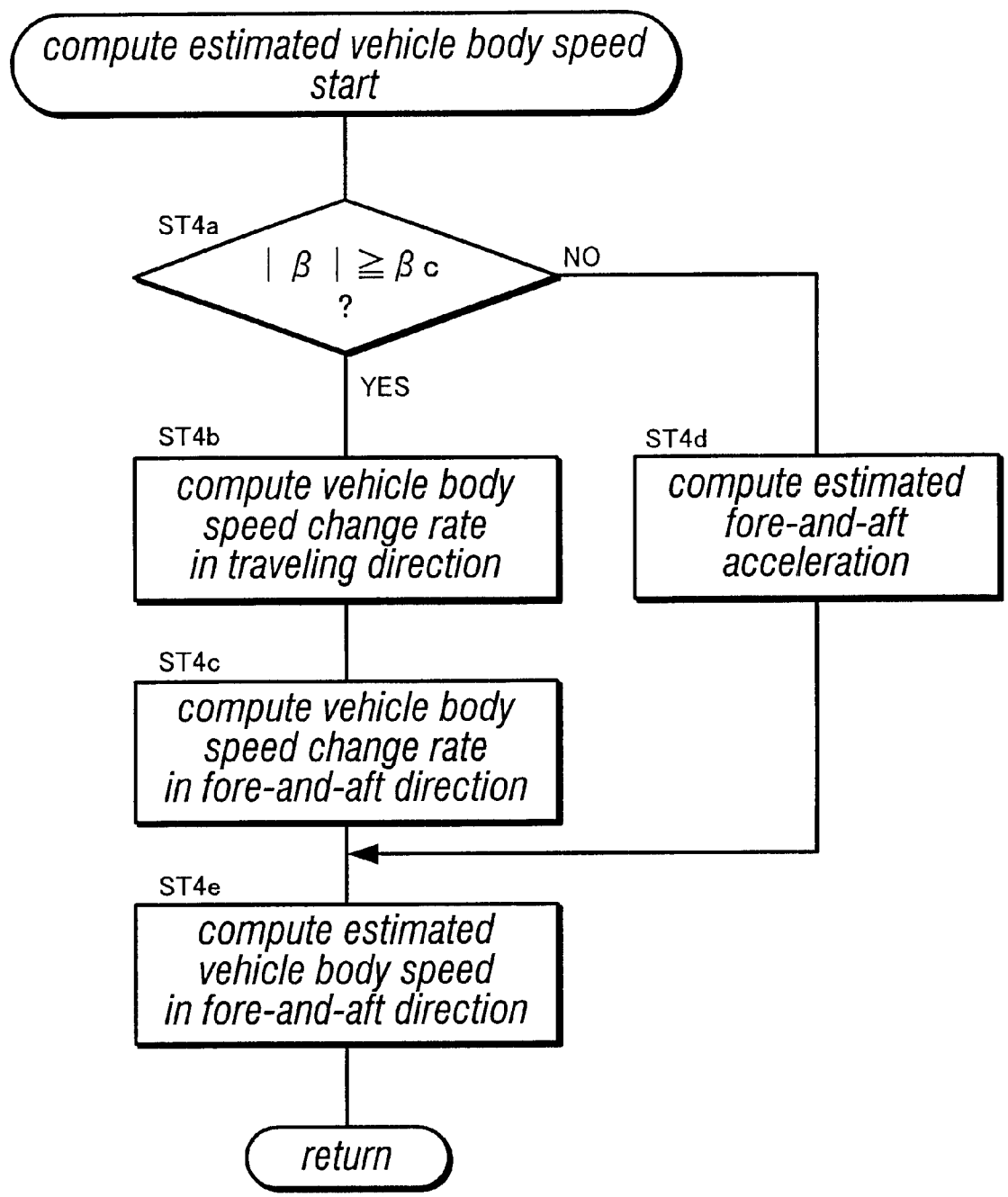
FIG. 5 is a subroutine flow chart for computing the estimated vehicle body speed.

Referring to FIG. 5, in step ST4$a$, it is determined if the absolute value of the vehicle body slip angle (side slip angle) $\beta$ is greater than a threshold value $\beta_c$. If it is the case ($|\beta| \geq \beta_c$), the program flow advances to step ST4$b$ where a vehicle body speed change rate VVBG in the traveling direction is computed from the following equation.

$$VVBG = (FGEF\cos\beta + LGEF\sin\beta) \times KX \quad (1)$$

where KX is a predetermined coefficient which depends on design parameters of the vehicle.

In step ST4$c$, a vehicle body speed change rate VVBG in the fore-and-aft direction is computed from the following equation.

$$VVXBG = VVBG\cos\beta \quad (2)$$

If the absolute value of the vehicle body slip angle (side slip angle) $\beta$ is smaller than the threshold value $\beta_c$ in step ST4$a$, the program flow advances to step ST4$d$ where the predetermined coefficient KX is multiplied to the estimated fore-and-aft acceleration, or $$FGEF \times KX \quad (3)$$

In step ST4$e$ which follows step ST4$c$ or step ST4$d$ as the case may be, the estimated vehicle body speed (X-component) $VVX\beta$ is obtained from the following equation $$VVX\beta(n)=VVX\beta(n-1)+VVXBG(n-1) \quad (4)$$

when step ST4e is reached via step ST4c, and from the following equation $$VVX\beta(n)=VVX\beta(n-1)+FGEF\times KX \quad (5)$$

when step ST4e is reached via step ST4d. Here, (n) indicates the current computation loop, and (n−1) indicates the previous computation loop.

The estimated vehicle body speed (X-component) VVXβ is thus computed by the subroutine steps ST4a to ST4e of step ST4 of the main routine, and the estimated vehicle body speed is determined in the estimated vehicle body speed (X-component) computing unit VVXβ.

Referring to FIG. 2, the estimated vehicle body speed (X-component) computing unit VVXβ and the vehicle body slip angle (side slip angle) β are forwarded to the estimated vehicle body speed computing unit VVβ. The estimated vehicle body speed (X-component) VVXβ is computed as described in connection with the subroutine flow described above (steps ST4a to ST4e). Therefore, when estimating the vehicle body speed VVβ, the values of the road surface frictional coefficient μ, vehicle body slip angle (side slip angle) β, tire slip ratios $SLP_{mn}$, brake/traction forces $FX_{mn}$, estimated fore-and-aft acceleration FGE (FGEF), tire lateral forces $CF_{mn}$ and estimated lateral acceleration LGE (LGEF) are used, and the dynamic state of the vehicle, including the road condition, is represented by a vehicle model. Therefore, the estimated vehicle body speed can be determined accurately by eliminating the effects of the slippage of the tires during braking, road noises and an offset due to the inclination of the road that may be present when a fore-and-aft acceleration is used.

As a result, the vehicle body speed can be obtained highly accurately even when the vehicle is cornering and a substantial slippage of the tires is present, and the precision of the vehicle motion control based on the vehicle speed can be ensured. Once the estimated vehicle body speed (X-component) VVXβ is obtained, the program flow advances to step ST5.

In step ST5, the rolling direction speeds $VC_{FR}$, $VC_{FL}$, $VC_{RR}$ and $VC_{RL}$ of the various wheels are obtained as a basis for the speeds of the various tires. First of all, the contact point speed (X-component) computing unit $VCX_{mn}$ provides relevant information on the various tires according to the estimated vehicle body speed (X-component) VVXβ in combination with the estimated yaw rate CFYAWR. This allows the contact point speeds (X-component) $VCX_{FR}$, $VCX_{FL}$, $VCX_{RR}$ and $VCX_{RL}$ to be determined individually for the different tires. Likewise, the contact point speed (Y-component) computing unit $VCY_{mn}$ allows the contact point speeds (Y-component) $VCY_{FR}$, $VCY_{FL}$, $VCY_{RR}$ and $VCY_{RL}$ to be determined individually for the different tires according to the estimated vehicle body speed (X-component) VVXβ and estimated yaw rate CFYAWR in combination with the vehicle body slip angle β. Therefore, when the vehicle body slip angle β is zero, the contact point speeds (Y-component) are zero.

Because the contact point speed (X-component) and contact point speed (Y-component) are X and Y components of the contact point speed in the rolling direction of reach tire, the contact point speed (X-component) computing unit $VCX_{mn}$ and contact point speed (Y-component) computing unit $VCY_{mn}$ jointly form a contact point direction speed (X- and Y-components) computing unit. The contact point rolling direction speed computing unit $VC_{mn}$ computes the rolling direction speeds $VC_{FR}$, $VC_{FL}$, $VC_{RR}$ and $VC_{RL}$ of the individual wheels according to the contact point speeds (X-component) $VCX_{mn}$ and contact point speeds (Y-component) $VCY_{mn}$.

In step ST6, the tire slip ratios $SLP_{mn}$ of the individual wheels are obtained. This computation may be based on either the rolling direction speeds $VC_{mn}$ or wheel speeds $VW_{mn}$. When the computation is based on the rolling direction speeds $VC_{mn}$, $SLP_{mn}$ is determined as given by the following equation.

$$SLP_{mn}=100\times(VC_{mn}-VW_{mn})/VC_{mn} \quad (6)$$

When the computation is based on the wheel speeds $VW_{mn}$, $SLP_{mn}$ is determined as given by the following equation.

$$SLP_{mn}=100\times(VC_{mn}-VW_{mn})/VW_{mn} \quad (7)$$

Figure 6:
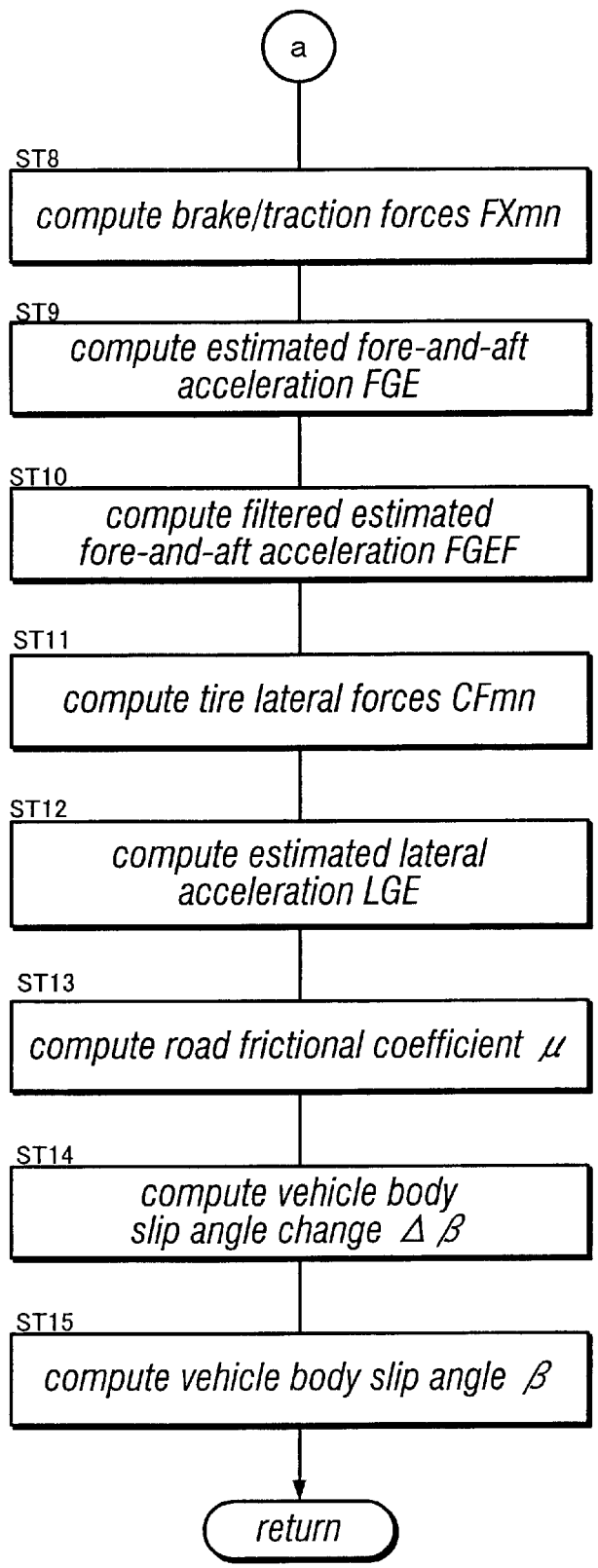
FIG. 6 is a second part of the general flow chart.

In step ST7, the tire (lateral) slip angles $\alpha_{mn}$ are obtained from the contact point speeds (X-component) $VCX_{mn}$ and contact point speeds (Y-component) $VCY_{mn}$ before the program flow advances to step ST8 shown in FIG. 6.

Figure 7:
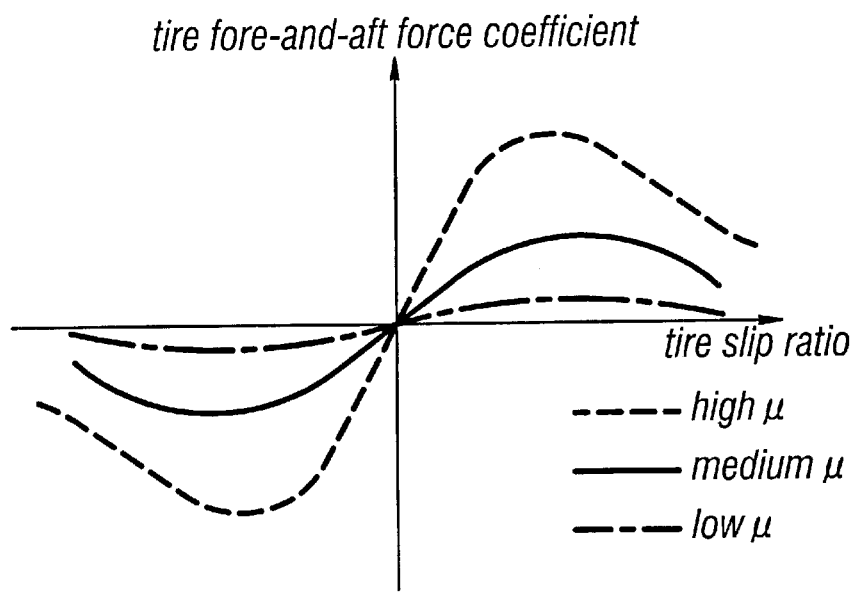
FIG. 7 is a graph representing the map for obtaining the tire fore-and-aft force coefficient.

In step ST8, the brake/traction forces (tire fore-and-aft forces) $FX_{mn}$ are computed according to the wheel loads $FZ_{mn}$, tire slip ratios $SLP_{mn}$ and road surface frictional coefficient μ that are forwarded to the tire fore-and-aft forces computing unit $FX_{mn}$. To simplify the computation, as shown in FIG. 7, the road surface frictional coefficient μ may be classified into three levels (high, medium and low) and a corresponding lookup table based on such a classification of the road surface frictional coefficient μ may be prepared so as to allow brake/traction force (tire fore-and-aft force) coefficients to be determined according to the corresponding tire slip ratios. By multiplying the brake/traction force (tire fore-and-aft force) coefficients, obtained from the table represented in FIG. 7, to the corresponding wheel loads, the brake/traction forces (tire fore-and-aft forces) for the individual wheels can be determined.

By using a three dimensional map taking into account the estimated road surface frictional coefficient as shown in FIG. 7, the estimation precision can be improved. The map preferably takes into account three or more levels of the road surface frictional coefficient.

In step ST9, the estimated fore-and-aft acceleration FGE is obtained from the brake/traction forces (tire fore-and-aft forces) $FX_{mn}$ computed in step ST8. The equation for this computation may be as given in the following.

$$FGE=(FX_{FR}+FX_{FL}+FX_{RR}+FX_{RL})/(\text{total vehicle weight}) \quad (8)$$

In step ST10, the estimated fore-and-aft acceleration FGE is filtered by an estimated fore-and-aft acceleration filter FGEF. In this case, the estimated fore-and-aft acceleration FGE may be filtered simply by using a low pass filter.

Figure 8:
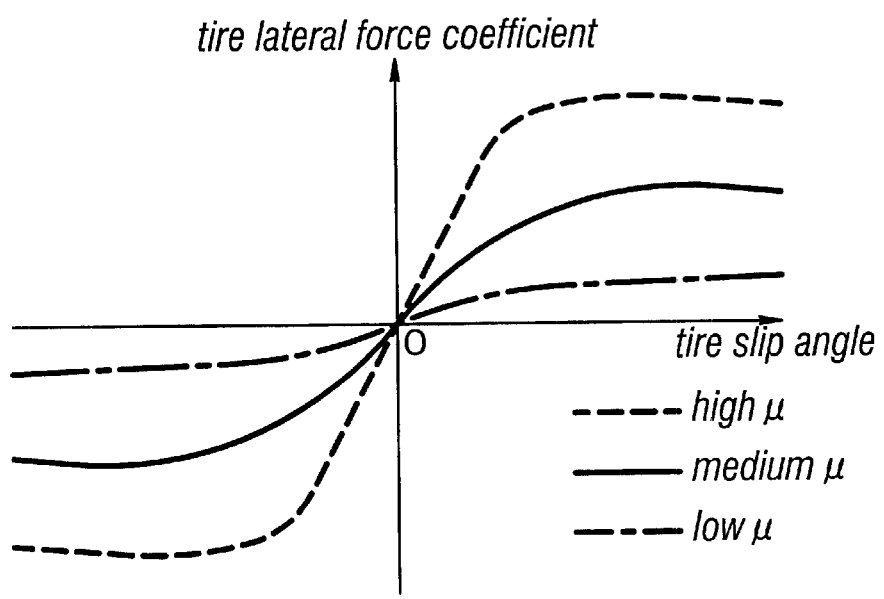
FIG. 8 is a graph representing the map for obtaining the tire lateral force coefficient.

In step ST11, the tire lateral forces $CF_{mn}$ of the individual wheels are computed according to the wheel loads $FZ_{mn}$, cornering forces $FY_{mn}$ and road surface frictional coefficient μ, in addition to the tire slip ratios $SLP_{mn}$ that were obtained in step ST6. In this case also, to simplify the computation, as shown in FIG. 8, the road surface frictional coefficient μ may be classified into three levels (high, medium and low) and a corresponding lookup table based on such a classification of the road surface frictional coefficient μ may be prepared so as to allow tire lateral force coefficients to be determined according to the corresponding tire slip angles. By multiplying the tire lateral force coefficients to the corresponding wheel loads, the tire lateral forces $CF_{mn}$ for the individual wheels when the tire slip ratio is zero can be determined.

Figure 9:
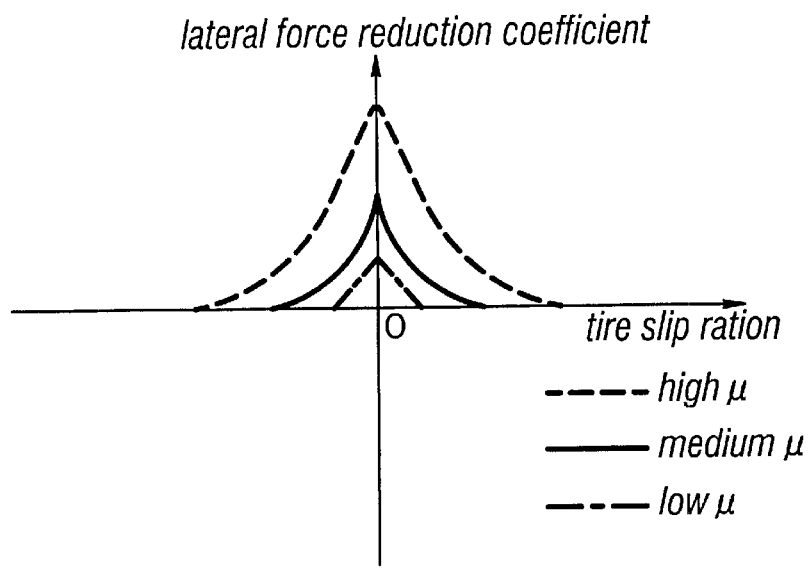
FIG. 9 is a graph representing the map for obtaining the tire lateral force reduction coefficient.

Tire lateral force reduction coefficients are then obtained from a lookup table as shown in FIG. 9 in which the tire lateral force reduction coefficient is given in relation to the tire slip ratio by classifying the estimated road surface frictional coefficient $\mu$ into three levels as was the case with the graphs of FIGS. 7 and 8. The tire lateral force reduction coefficient thus obtained according to the particular tire slip ratio from this three-dimensional graph for each wheel is then multiplied to the tire lateral force $CF_{mn}$ (for the case where the slip ratio is zero) to provide highly accurate values of the tire lateral forces $CF_{mn}$.

In step ST12, the estimated lateral acceleration LGE is obtained in the estimated lateral acceleration computing unit LGE from the following equation according to the tire lateral forces obtained from the tire lateral force computing unit $CF_{mn}$.

$$LGE=(CF_{FR}+CF_{FL}+CF_{RR}+CF_{RL})/(\text{total vehicle weight}) \quad (9)$$

Figure 10:
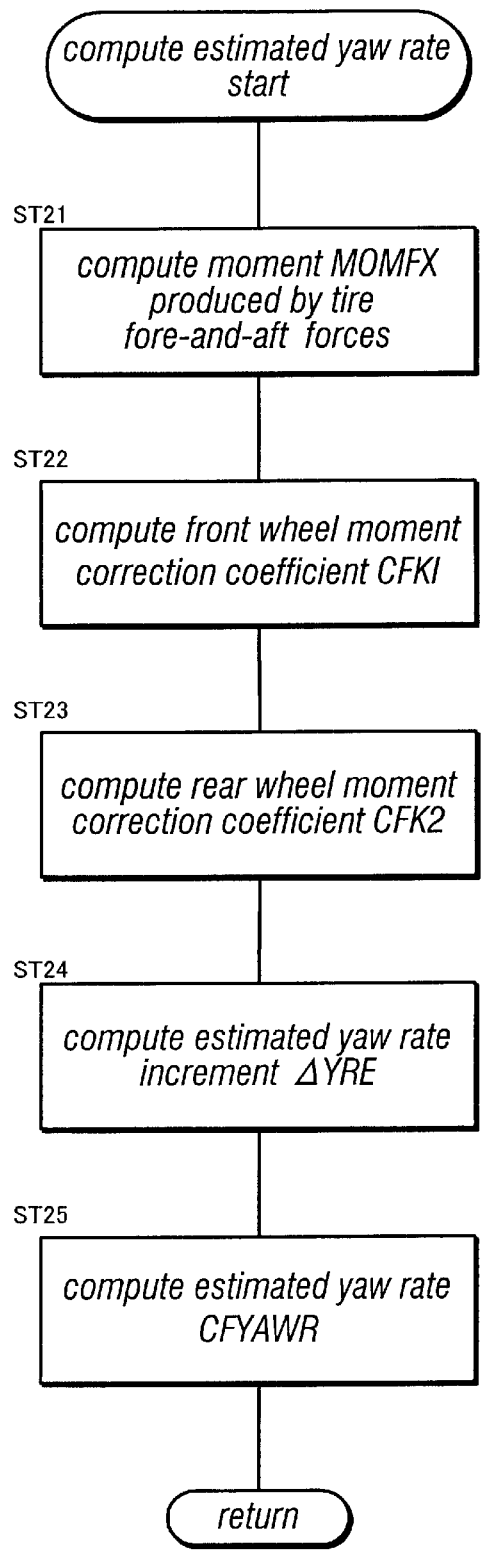
FIG. 10 is a subroutine flow chart for computing the estimated yaw rate.

The estimated yaw rate CFYAWR may be obtained between steps ST12 and ST13, and the subroutine for the computation of the estimated yaw rate CFYAWR is given in FIG. 10.

Referring to FIG. 10, in step ST21, the moment MOMFX produced by the fore-and-aft forces of the tires is computed, for instance, according to the following equation.

$$MOMFX=(FX_{FR}-FX_{FL})\times TRDF+(FX_{RR}-FX_{RL})\times TRDR \quad (10)$$

where TRDF and TRDR are the treads of the front and rear wheels, respectively (see FIG. 3).

In step ST22, the front wheel moment correction coefficient CFK1 based on MOMFX of Equation 10 is computed in a front and rear wheel moment (yaw rate correction coefficient) computing unit CFKx.

$$CFK1=\{LSR\times(CF_{FR}+CF_{FL}+CF_{RR}+CF_{RL})+(\Delta YRR/KDYR)+MOMFX\}/\{(LSF+LSR)/(CF_{FR}+CF_{FL})\} \quad (11)$$

where LSF is the distance between the gravitational center of the vehicle body and the front axle, LSR is the distance between the gravitational center of the vehicle body and the rear axle (see FIG. 3), and KDYR is a coefficient for converting the actual yaw rate increment $\Delta YRR$ into a moment.

In step ST23, the rear wheel moment correction coefficient CFK2 is computed in a similar fashion.

$$CFK2=\{LSF\times(CF_{FR}+CF_{FL}+CF_{RR}+CF_{RL})+(\Delta YRR/KDYR)+MOMFX\}/\{(LSF+LSR)/(CF_{RR}+CF_{RL})\} \quad (12)$$

In step ST24, the estimated yaw rate increment (estimated yaw moment) $\Delta YRE$ based on CFK1 and CFK2 obtained in the preceding steps is computed in an estimated yaw rate increment computing unit $\Delta YRE$ according to the following equation.

$$\Delta YRE=\{LSF\times CFK1\times(CF_{FR}+CF_{FL})-LSR\times CFK2\times(CF_{RR}+CF_{RL})-MOMFX\}\times KDYR \quad (13)$$

By integrating the estimated yaw rate increment (estimated yaw moment) $\Delta YRE$, the estimated yaw rate (estimated vehicle body yaw rate) can be obtained.

In step ST25, the estimated yaw rate CFYAWR(n) of the current loop of the subroutine is computed in the estimated yaw rate computing unit CFYAWR according to the following equation.

$$CFYAWR(n)=CFYAWR(n-1)+\Delta YRE(n)\times Tr \quad (14)$$

where CFYAWR(n-1) is the estimated yaw rate that was obtained in the previous loop of the subroutine, and Tr is the loop time for this computation. By thus obtaining the estimated yaw rate CFYAWR, the accuracy of the yaw rate for the motion control, particularly when the vehicle is cornering, can be improved.

According to the conventional arrangement in which the yaw rate is obtained from the difference between the rotational speeds of the right and left wheels, because the yaw rate value disappears when a brake is applied, the yaw rate value is not available for the yaw moment control at such a time. According to the other conventional arrangement in which the yaw rate is obtained from the lateral forces and fore-and-aft forces of the tires, the accuracy of the estimated tire lateral forces tends to be impaired when the dynamic tire model for estimating the lateral forces and fore-and-aft forces of the tires does not correctly model the actual tires, particularly when there are disturbances from the road surface, and/or when there are errors in the vehicle body slip angle and/or estimated road surface frictional coefficient which are highly essential for the vehicle motion control. All these factors contribute to the reduction in the accuracy of the estimated yaw rate.

On the other hand, according to the foregoing embodiment, not only the yaw rate YAWR obtained from the yaw rate sensor YAWR is used but also the tire slip ratios $SLP_{mn}$, tire slip angles $\alpha_{mn}$ and road surface frictional coefficient $\mu$ are obtained, and the tire fore-and-aft forces $FX_{mn}$ are computed by using a corresponding dynamic tire model. Further, the front and wheel moment correction coefficients CFK1 and CFK2 are computed from the tire fore-and-aft forces $FX_{mn}$, tire lateral forces $FY_{mn}$ and yaw rate YAWR, and the estimated yaw rate CFYAWR is obtained from the estimated yaw moment $\Delta YRE$ computed from the tire fore-and-aft forces $FX_{mn}$, tire lateral forces $FY_{mn}$ and front and wheel moment correction coefficients CFK1 and CFK2. This allows the estimated yaw rate CFYAWR to accurately reflect the actual vehicle motion under all conditions, and the problems associated with the prior art such as the loss of accuracy in the estimated yaw rate can be eliminated.

Even when there are some errors in the estimation of the tire lateral forces $FY_{mn}$, for instance, due to the use of non-standard tires and disturbances from the road surfaces, the errors in the tire lateral forces $FY_{mn}$ and lateral acceleration LGE can be eliminated or minimized by using the front and wheel moment correction coefficients CFK1 and CFK2, and the adaptability of the dynamic tire model can be improved.

According to the prior art, the vehicle body slip angle (side slip angle) $\beta$ can be obtained by computing the vehicle body slip angle increment from the lateral acceleration, vehicle body speed and yaw rate, and integrating the thus obtained vehicle body slip angle increment. However, according to such a conventional approach, when there is an offset in the zero point of the yaw rate sensor, because the vehicle body slip angle is obtained by integrating "vehicle body lateral acceleration/vehicle body speed yaw rate", the offset is also integrated, and an excessive error is produced in the vehicle body slip angle.

On the other hand, according to the foregoing embodiment, instead of using the detected value of the yaw rate sensor, the vehicle body slip angle increment $\Delta\beta$ is obtained from the lateral acceleration LGE (LGEF), vehicle body speed VV$\beta$ and estimated yaw rate CFYAWR, and the vehicle body slip angle $\beta$ is obtained by adding the vehicle body slip angle increment $\Delta\beta$ to the previously obtained vehicle body slip angle $\beta(n-1)$. Thus, even when there is a significant offset in the zero point of the yaw rate sensor, the accuracy of the vehicle body slip angle $\beta$ can be ensured.

In the control process described above, the maps which take into account the road surface frictional coefficient were used for obtaining the tire fore-and-aft force coefficient, tire lateral force coefficient and tire lateral force reduction coefficient. In the foregoing embodiment, three possible levels were selected for the road surface frictional coefficient (high $\mu$, medium $\mu$ and low $\mu$). By thus preparing a plurality of tire models for the different levels of the road surface frictional coefficient, the cornering forces, vehicle body fore-and-aft forces (tire lateral and fore-and-aft forces) can be computed by fully taking into account the actual road surface frictional coefficient and other road surface conditions, and the vehicle body slip angle $\beta$ can be determined at a high precision. The estimated yaw rate CFYAWR can be thus used advantageously as the yaw rate for determining the state of the vehicle and executing the motion control of the vehicle.

In step ST13, the estimated road surface frictional coefficient $\mu$ is obtained. The estimated road surface frictional coefficient $\mu$ can be obtained from the filtered estimated lateral acceleration value LGEF, filtered estimated fore-and-aft acceleration value FGEF and total grip force TG according to the process flow depicted in the subroutine flow chart of FIG. 11.

Figure 11:
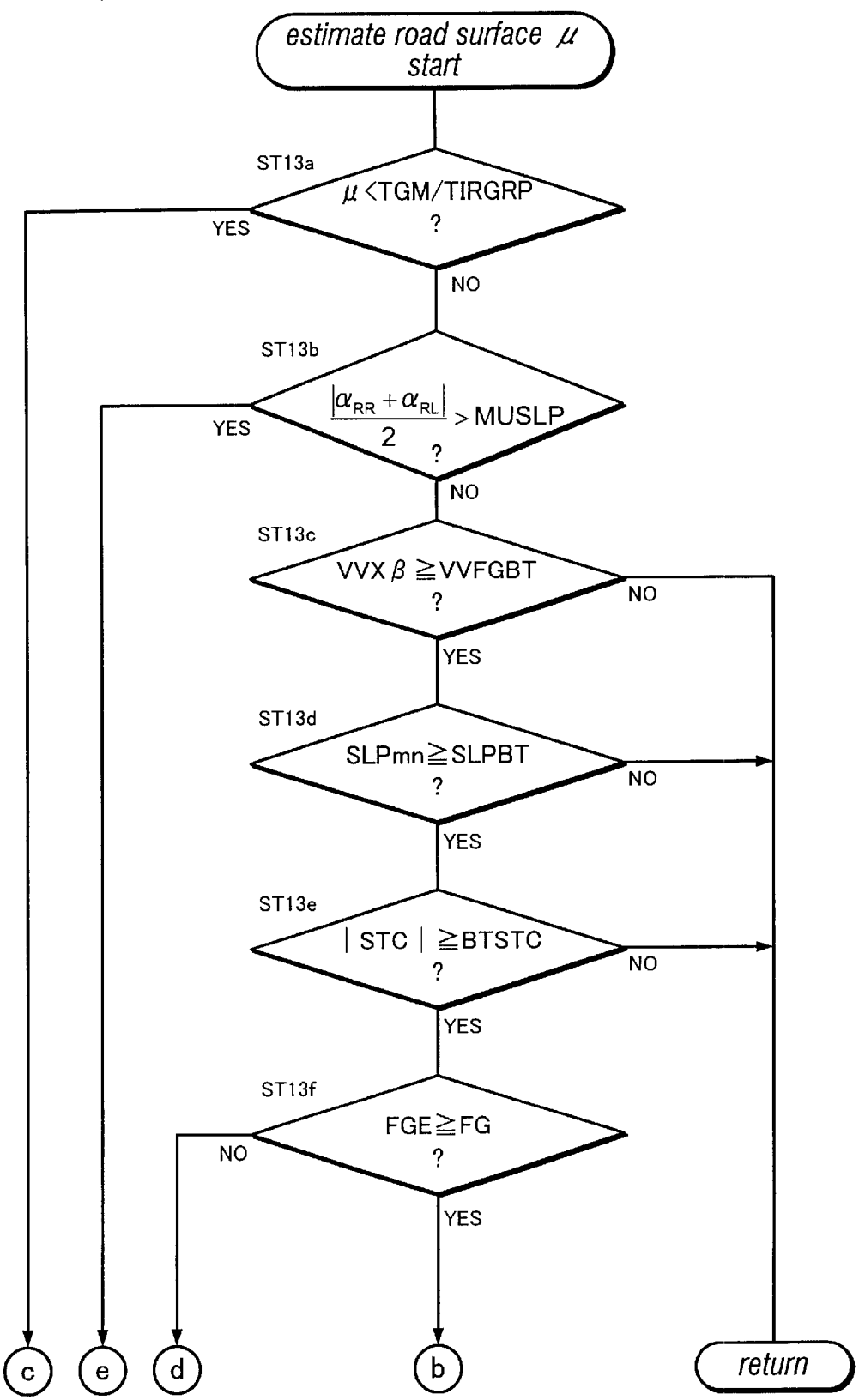
FIG. 11 is a first part of a subroutine flow chart for computing the road surface frictional coefficient.

Referring to FIG. 11, in step ST13a, it is determined if the current estimated road surface frictional coefficient $\mu$ is smaller than the tire grip force converted value. The tire grip force converted value can be represented as a value (TGM/TIRGRP) associated with the total grip force TGM. Here, TIRGRP is a conversion coefficient for changing the dimension of the total grip force TGM to that of the road surface frictional coefficient. The initial value of the road surface frictional coefficient may be 1 which corresponds to a dry road surface.

If the current estimated road surface frictional coefficient $\mu$ is equal to or greater than the tire grip force converted value in step ST13a, the program flow advances to step 13b to start the process of estimating the road surface frictional coefficient. In step ST13b, it is determined if the averaged value of the tire slip angles $\alpha_{RR}$ and $\alpha_{RL}$ of the rear wheels is greater than a threshold value MUSLP. In the drawing, these values are given as absolute values because the tire slip angle is either a negative or positive value depending on the direction of the angle with respect to the neutral direction. When the average value of the tire slip angles of the rear wheels is greater than the threshold value, the road surface frictional coefficient is obtained with respect to a lateral movement. Conversely, when the average value of the tire slip angles of the rear wheels is equal to or smaller than the threshold value, the program flow advances to step ST13c, and the road surface frictional coefficient is obtained with respect to a fore-and-aft movement.

In steps ST13c to 13e, it is determined if all the conditions including the vehicle speed, tire slip ratios and steering angle that are required for the computation of the road surface frictional coefficient with respect to a fore-and-aft movement are all met.

In step ST13c, it is determined if the estimated vehicle body speed (X-component) VVX$\beta$ is equal to or greater than a threshold value VVFGBT. If it is the case, the program flow advances to step ST13d. Otherwise, the current loop of the subroutine flow is terminated. In step ST13d, it is determined if the slip ratio SLP$_{mn}$ of at least one of the wheels is equal to or greater than a threshold value SLPBT. If it is the case, the program flow advances to step ST13e. Otherwise, the current loop of the subroutine flow is terminated. In step ST13d, it is determined if the absolute value of the steering angle STC is equal to or greater than a threshold value BTSTC. If it is the case, the program flow advances to step ST13f. Otherwise, the current loop of the subroutine flow is terminated.

In step ST13f, it is determined if the estimated fore-and-aft acceleration FGE is equal to or greater than the vehicle body fore-and-aft acceleration FG obtained from the acceleration sensor. If it is the case, the program flow advances to step ST13g shown in FIG. 12 to decrease the road surface frictional coefficient by one notch. Otherwise, the program flow advances to the steps for increasing the road surface frictional coefficient by one notch.

Figure 12:
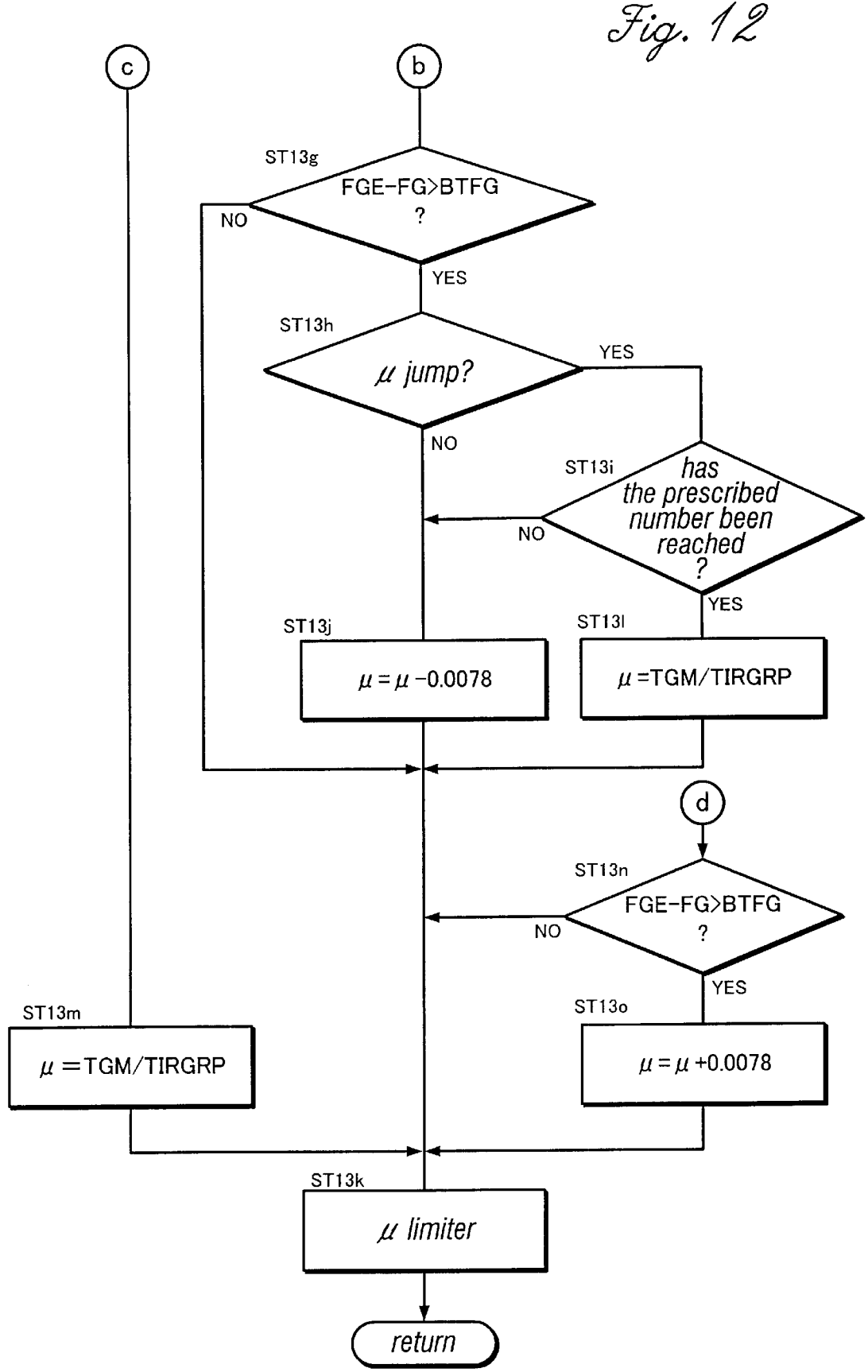
FIG. 12 is a second part of the subroutine flow chart for computing the road surface frictional coefficient.

Referring to FIG. 12, in step ST13g, it is determined if the value obtained by subtracting the vehicle body fore-and-aft acceleration FG obtained from the sensor from the estimated fore-and-aft acceleration FGE is greater than a threshold value BTFG. If it is the case, the program flow advances to step ST13h where it is determined if the state of exceeding the threshold value BTFG has persisted for more than a prescribed time period. If it is the case, it is determined as a case of $\mu$ jump (a case involving a large change in the road surface frictional coefficient), and the program flow advances to step ST13i. If there is no $\mu$ jump, the program flow advances to step ST13j.

In step ST13j, a certain value such as 0.0078 is subtracted from the current road surface frictional coefficient $\mu$ to lower the estimated road surface frictional coefficient $\mu$ before the program flow advances to step ST13k. In step ST13k, a limiter process is executed with respect to the upper and lower limits so that the estimated road surface frictional coefficient $\mu$ may be kept within a prescribed range and prevented from reaching an unrealistic value before the current loop of the subroutine flow is terminated.

In step ST13i, it is determined if a case of $\mu$ jump has been detected in step ST13h for more than a prescribed number of times. The program then advances to step ST13l if a $\mu$ jump has occurred for more than the prescribed number of times, and to step ST13j if not. In step ST13l, the tire grip force conversion value (TGM/TIRGRP) is substituted into the estimated road surface frictional coefficient $\mu$ before the program flow advances to step ST13k. If the value obtained by subtracting the vehicle body fore-and-aft acceleration FG obtained from the sensor from the estimated fore-and-aft acceleration FGE is equal to or smaller than the threshold value BTFG in step ST13g, the program flow also advances to step ST13k.

If the current estimated road surface frictional coefficient $\mu$ is found to be smaller than the tire grip force conversion value in step ST13a, the program flow advances to step ST13m. In step ST13m, the estimated road surface frictional coefficient $\mu$ is set as the tire grip force conversion value (TGM/TIRGRP) before the program flow advances to step ST13k.

If the estimated fore-and-aft acceleration value FGE is determined to be less than the vehicle body fore-and-aft acceleration FG detected by the sensor in step ST13f, the program flow advances to step ST13n shown in FIG. 12. In step ST13n, it is determined if the value obtained by subtracting the vehicle body fore-and-aft acceleration FG obtained from the sensor from the estimated fore-and-aft acceleration FGE is equal to or smaller than the threshold value BTFG. If this value is equal to or smaller than the threshold value BTFG, the program flow advances to step ST13k and otherwise to step ST13o. In step ST13o, a certain value such as 0.0078 is added to the current estimated road surface frictional coefficient $\mu$ to raise the estimated road surface frictional coefficient $\mu$ by one notch before the program flow advances to step ST13k.

Figure 13:
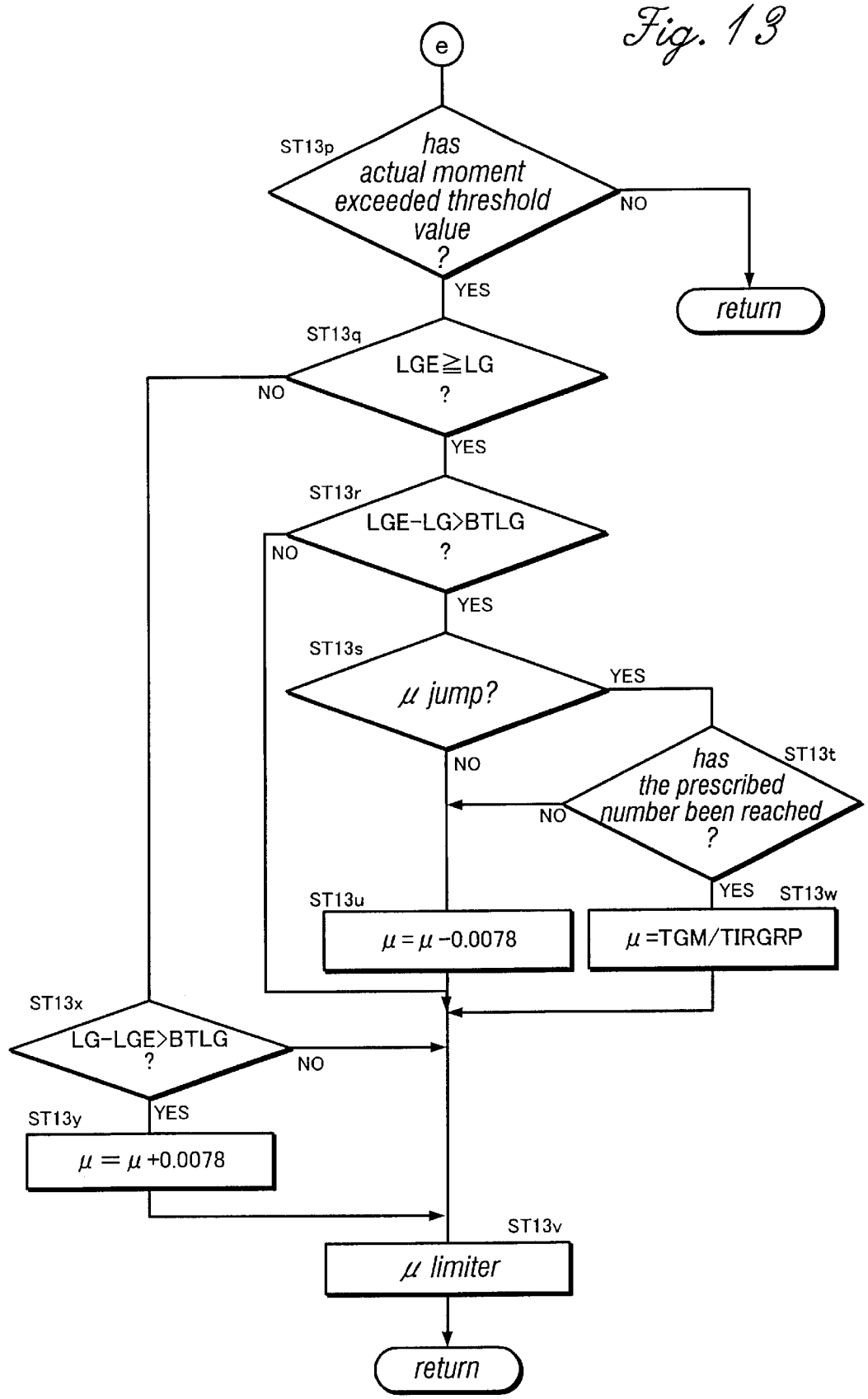
FIG. 13 is a third part of the subroutine flow chart for computing the road surface frictional coefficient.

In step ST13b, if the average value of the tire slip angles of the rear wheels is determined to be large, and the road surface frictional coefficient is therefore to be estimated with respect to a lateral movement, the program flow advances to step ST13p shown in FIG. 13. In step ST13p, it is determined if the actual yaw moment has exceeded a threshold value. Although this determination process is not shown in FIG. 2, it can be accomplished by forwarding the yaw rate YAWR detected by the yaw rate sensor 2 to the road surface frictional coefficient computing unit $\mu$, and executing a corresponding process in this unit. If the actual yaw moment is equal to or less than the threshold value, the current loop of the subroutine flow is terminated.

If it is determine that the actual yaw moment has exceeded the threshold value in step ST13p, the program flow advances to step ST13q. In step ST13q, it is determined if the estimated lateral acceleration LGE (LGEF) is equal to or grater than the vehicle body lateral deceleration LG detected by the sensor. If it is the case, the program flow advances to step ST13r to lower the estimated road surface frictional coefficient $\mu$. Otherwise, the program flow advances to the steps for raising the estimated road surface frictional coefficient $\mu$.

In step ST13r, it is determined if a value obtained by subtracting the vehicle body fore-and-aft acceleration LG obtained from the sensor from the estimated lateral acceleration LGE is greater than the threshold value BTLG. If it is the case, the program flow advances to step ST13s.

In step ST13s, it is determined if the state of exceeding the threshold value as determined in step ST13r has persisted for more than a prescribed period of time. If it is the case, the program flow advances to step ST13t as a case of a $\mu$ jump. Otherwise, the program flow advances to step ST13u.

In step ST13u, a certain value such as 0.0078 is subtracted from the current road surface frictional coefficient $\mu$ to lower the estimated road surface frictional coefficient $\mu$ before the program flow advances to step ST13v. In step ST13v, a limiter process is executed with respect to the upper and lower limits so that the estimated road surface frictional coefficient $\mu$ may be kept within a prescribed range and prevented from reaching an unrealistic value before the current loop of the subroutine flow is terminated.

In step ST13t, it is determined if a case of $\mu$ jump has been detected in step ST13s for more than a prescribed number of times. The program then advances to step ST13w if a $\mu$ jump has occurred for more than the prescribed number of times, and to step ST13u if not. In step ST13w, the tire grip force conversion value (TGM/TIRGRP) is substituted into the estimated road surface frictional coefficient $\mu$ before the program flow advances to step ST13v. If the value obtained by subtracting the vehicle body lateral acceleration LG obtained from the sensor from the estimated lateral acceleration sensor LGE is equal to or smaller than the threshold value BTLG in step ST13r, the program flow also advances to step ST13v.

If the estimated lateral acceleration value LGE (LGEF) is determined to be less than the vehicle body lateral acceleration LG detected by the sensor in step ST13q, the program flow advances to step ST13x. In step ST13x, it is determined if the value obtained by subtracting the vehicle body lateral acceleration LG obtained from the sensor from the estimated lateral acceleration LGE (LGEF) has exceeded the threshold value BTLG. If the threshold value has been exceeded, the program flow advances to step ST13y where a certain value such as 0.0078 is added to the current estimated road surface frictional coefficient $\mu$ to raise the estimated road surface frictional coefficient $\mu$ by one notch before the program flow advances to step ST13v.

By thus obtaining the estimated road surface frictional coefficient $\mu$, the accuracy of the road surface frictional coefficient $\mu$ can be improved. According to the prior art, the road surface frictional coefficient $\mu$ tended to be estimated higher than it actually is when the estimation relied only on the tire slip ratios $SLP_{mn}$ and the tire slip ratios are relatively small as is the case on snow covered roads or frozen roads. However, the logic of obtaining the estimated road surface frictional coefficient $\mu$ which is described above is free from such problems.

More specifically, according to the embodiment described above, the estimation can be carried out by using the vehicle body fore-and-aft and lateral accelerations in such a manner as to fully take into account the fact that the vehicle is traveling straight or cornering. Also, by detecting a $\mu$ jump, the estimated road surface frictional coefficient $\mu$ is prevented from deviating significantly from the actual value, and a value which agrees with or close to the actual road surface frictional coefficient $\mu$ can be obtained at all times. Also, the fore-and-aft accelerations, lateral accelerations and yaw moment can be estimated from the tire data maps (FIGS. 7 and 8) for determining the tire slip angles $\alpha_{mn}$, tire lateral forces and tire fore-and-aft forces, and the estimated road surface frictional coefficient $\mu$ can be corrected or adjusted by comparing these estimated values with the values actually detected by the sensors (to effect the raising and lowering of $\mu$ which was described above). Based on the adjusted estimated road surface frictional coefficient $\mu$, the gains of the tire data maps can be adapted. In the illustrated embodiment, the tire data maps are adapted to three levels of the road surface frictional coefficient $\mu$.

Thus, the road surface frictional coefficient $\mu$ can be estimated at a high precision without regard to the condition of the vehicle, in particular without regard to if the vehicle is accelerating, decelerating, traveling straight or cornering. The precision of the road surface frictional coefficient $\mu$ can be as high as 0.05 if the precision of the tire slip angles $SLP_{mn}$ is in the order of 0.5 degrees.

In step ST14, the vehicle body slip angle increment (side slip angle increment) $\Delta\beta$ is computed in the vehicle body slip angle increment computing unit $\Delta\beta$ according to the following equation, $$\Delta\beta = KLGVXD \times (LGE/VV\beta) - CFYAWR \quad (15)$$

where KLGVXD is a coefficient for conforming the dimension of the quotient of the estimated lateral acceleration LGE (LGEF) to the estimated vehicle body speed $VV\beta$ to that of the estimated yaw rate CFYAWR. The vehicle body slip angle (side slip angle) $\beta$ can be obtained by integrating the vehicle body slip angle increment (slide slip angle increment) $\Delta\beta$.

In step ST15, the vehicle body slip angle (side slip angle) $\beta$ is computed in the vehicle body slip angle (side slip angle) computing unit $\beta$ according to the following equation.

$$\beta(n) = \beta(n-1) + \Delta\beta(n) \quad (16)$$

where (n) indicates the value computed in the current loop and (n−1) indicates the value computed in the previous loop. In other words, the vehicle body slip angle $\beta$ is computed by adding the vehicle body slip angle increment $\Delta\beta$ obtained in step ST14 of the current loop to the vehicle body slip angle $\beta(n-1)$ obtained in the previous loop.

The computation of the vehicle body slip angle $\beta$ described above is based on a tire model which yields the tire fore-and-aft forces and tire lateral forces by fully taking into account the different levels (high, medium and low) of the road surface frictional coefficient, and can produce the vehicle body slip angle β at a high precision by minimizing the errors in the estimated values of the tire lateral forces and tire fore-and-aft forces (brake/traction forces).

The control system having the structure described above can perform a control action which provides both a high stability and a favorable steerability. As an example of such a control action, the control process in cases of oversteer and understeer is described in the following.

According to a conventional arrangement, a control variable is obtained from the values of the steering angle and yaw rate that are detected by using sensors, and the moment of the vehicle body is controlled by selectively activating the brakes of the different wheels in appropriate manners in cases of oversteer and understeer. More specifically, the control variable is given as a deviation of the yaw rate as detected by a yaw rate sensor from a standard yaw rate determined from the steering angle, and the vehicle body moment is controlled in such a manner that the outer wheels are braked in case of understeer and the inner wheels are braked in case of oversteer. However, according to such a yaw rate control, because the road grip conditions of the four wheels are not directly monitored, the yaw moment may be controlled, but it does not mean that the travel path of the vehicle is controlled. For instance, the travel path of the vehicle may swerve outward while the vehicle turns a corner (drift out).

On the other hand, according to the control system of the present invention described above, the estimated vehicle body speed VVβ, road surface frictional coefficient $\mu$, vehicle body slip angle β and tire slip angles $\alpha_{mn}$ are estimated, and the two rear wheels and outer front wheel are braked in a controlled manner in dependence on the vehicle body slip angle β in the case of oversteer while the two rear wheels are braked in a controlled manner in case of understeer in dependence on the degree of understeer. By thus controlling the vehicle body moment and reducing the kinetic energy of the vehicle, undesired motions of the vehicle such as a drift out can be avoided.

Figure 14:
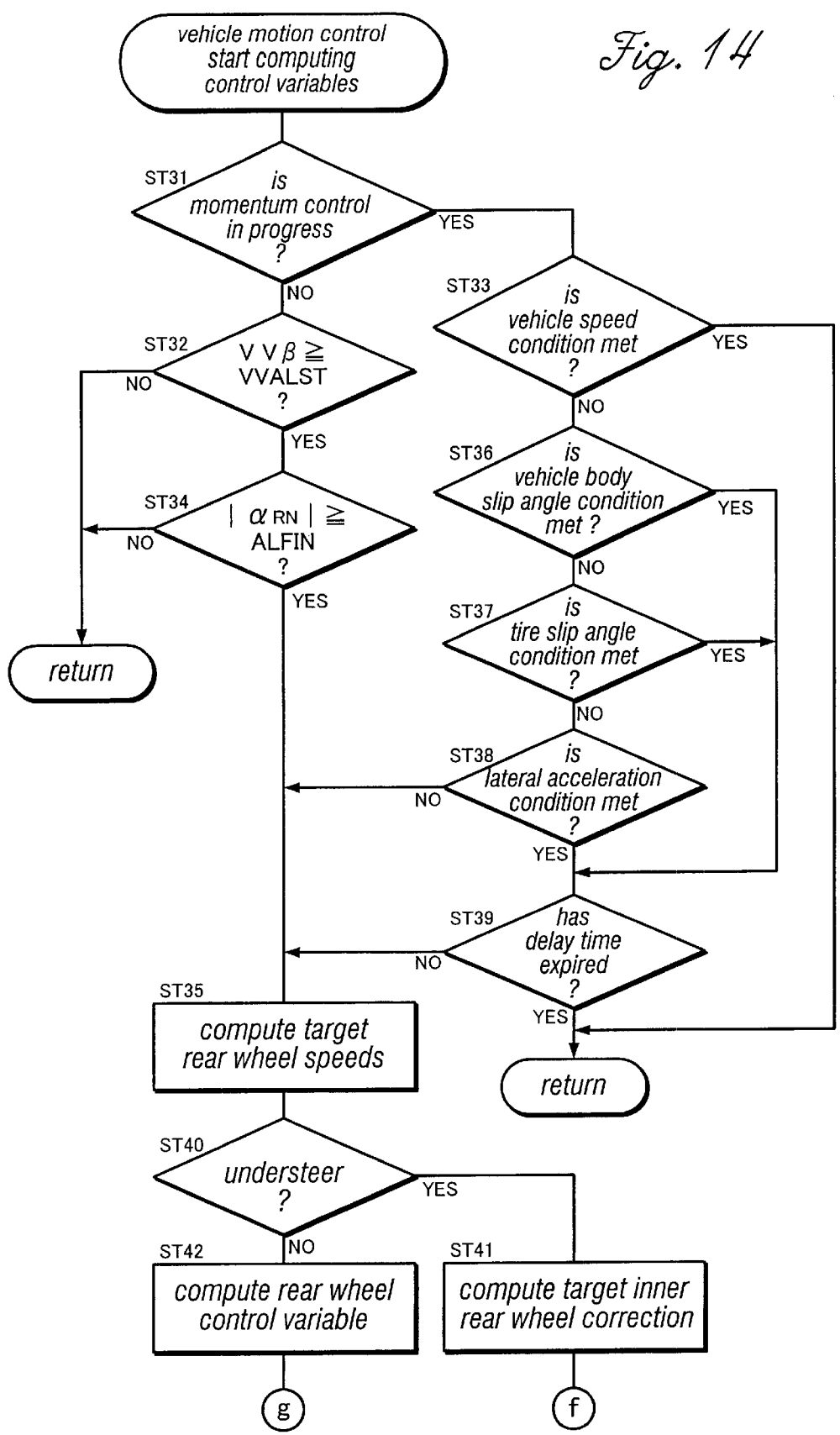
FIG. 14 is a first part of a subroutine flow chart for computing the degree of the vehicle momentum control.
Figure 15:
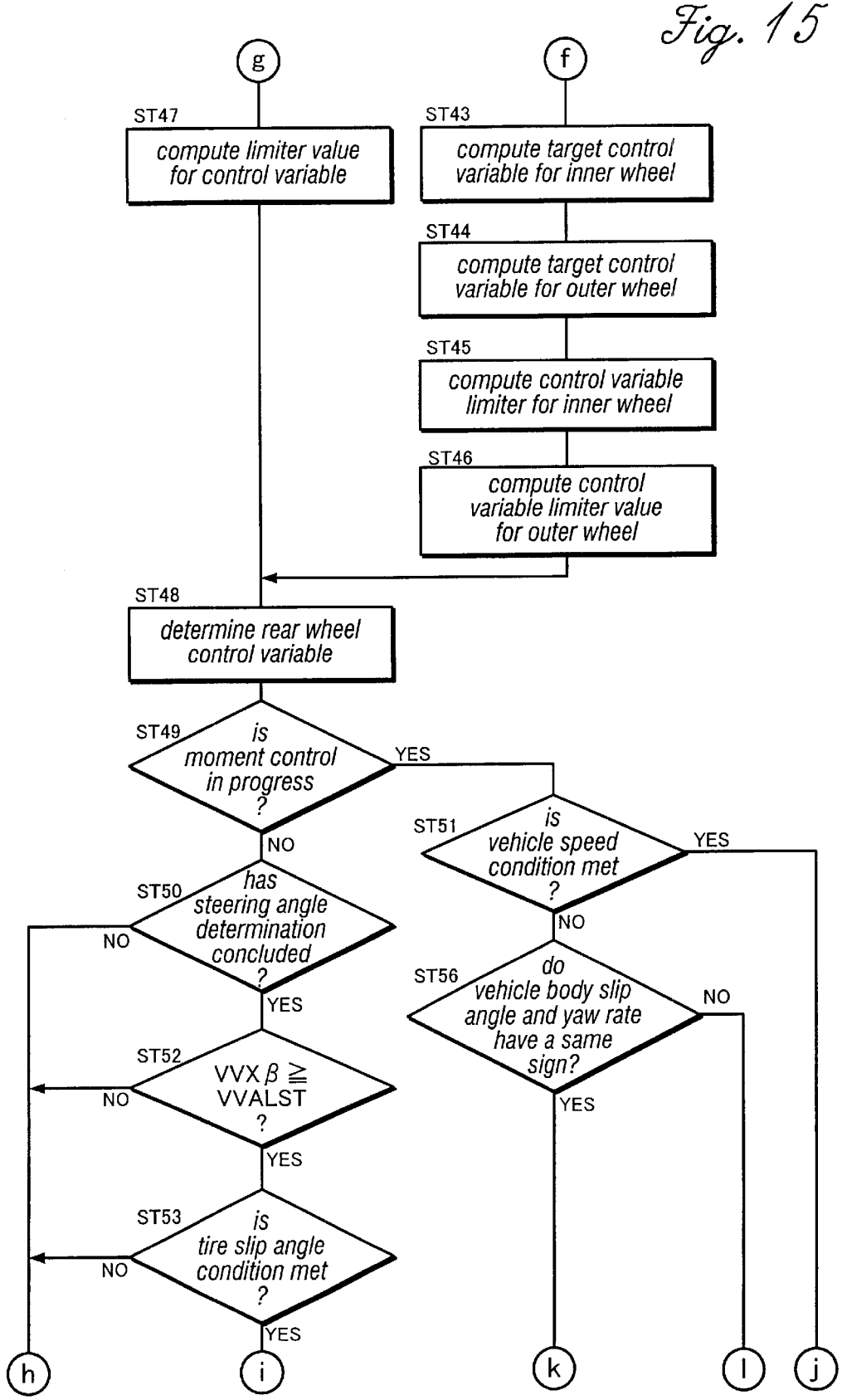
FIG. 15 is a second part of the subroutine flow chart for computing the degree of the vehicle momentum control.

An exemplary control process at the time of oversteer/understeer is described in the following with reference to the flow charts of FIGS. 14 to 16 and the control logic block diagram of FIG. 17. Referring to FIG. 14, in step ST31, it is determined if the momentum reduction control is in progress. As the control process at the time of oversteer/understeer requires at least the two rear wheels to be braked, it is desirable to determine if the rear wheels are being braked. If it is not the case, the program flow advances to step ST32 to start this control process. If the rear wheels are being braked, the program flow advances to step ST33 to execute the process of terminating the momentum reduction control.

In step ST32, as a condition for starting the momentum reduction control, it is determined if the estimated vehicle body speed VVβ is equal to or greater than a threshold value VVALST (20 km/h, for instance). If it is the case, the program flow advances to step ST34 to determine if there is a slippage exceeding a prescribed level existing for each of the wheels. In step ST34, it is determined if the absolute value of the tire slip angle $\alpha_{R_n}$ of either one of the rear wheels is equal to or greater than a threshold value ALFIN. If it is the case, the program flow advances to step ST35.

The condition for starting the momentum reduction control is determined from the vehicle speed and the tire slip angles of the rear wheels. If the variable is below the corresponding threshold value in step ST32 or ST33, the current loop of the subroutine is terminated.

In step ST35, the basic target rear wheel speeds $VI_{R_n}$ are that are required for the momentum reduction control of the vehicle are computed. Referring to FIG. 17, the basic target rear wheel speeds $VI_{R_n}$ are computed by computing a target wheel speed modification ratio RUDVR from the standard yaw rate MYRNO obtained from the steering angle STC and yaw rate YAWR, computing the rolling direction speeds $VC_{mn}$ from the estimated vehicle body speed (X-component) VVXβ, and then computing the basic target rear wheel speeds $VI_{R_n}$ from the target wheel speed modification ratio RUDVR and rolling direction speeds $VC_{mn}$.

In step ST33, it is determined if the vehicle speed condition is met by comparing the vehicle speed with a threshold vehicle speed (10 km/h, for instance) that can be safely considered as a substantially stationary state. If the vehicle is in a substantially stationary state, the current loop of the subroutine is terminated as a case of the vehicle speed condition having been met for terminating the momentum reduction control. Otherwise, the program flow advances to step ST36 as case of the vehicle speed condition not having been met. In other words, the vehicle momentum control is continued only if the momentum of the vehicle is not insignificant.

In step ST36, the vehicle body slip angle condition is evaluated by comparing the vehicle body slip angle with a threshold value. If the vehicle body slip angle is equal to or greater than a threshold value, the program flow advances to step ST37. In other words, if the vehicle body slip angle becomes excessive during the rear wheel control, the momentum control is terminated so as to prevent the vehicle motion to become unstable (oversteer or spin).

In step ST37, it is determined if the tire slip angle condition is met by comparing the tire slip angle with a threshold value. If the tire slip angle is equal to or greater than the threshold value (which indicates the regaining of the stable condition), the program flow advances to step ST38. In step ST38, it is determined if the lateral acceleration condition is met by comparing the lateral acceleration with a threshold value. If the lateral acceleration is equal to or greater than the threshold value (which indicates the regaining of the stable condition), the program flow advances to step ST39. Otherwise, the program flow advances to step ST35 to continue the ongoing momentum reduction control. If the vehicle body slip angle condition is met in step ST36, or if the tire slip angle condition is met in step ST37, the program flow advances to step ST39.

In step ST39, it is determined if a delay time (200 ms, for instance), by elapsing of which indicates that the momentum reduction control may be terminated, has expired. If the delay time has not expired, the program flow advances to step ST35 to continue the ongoing momentum reduction control. Otherwise, the current loop of the subroutine is terminated. Thus, the vehicle momentum control is continued as long as a certain condition is met, and would not be terminated in a short period of time once it is started.

If the program flow has advanced to step ST35, it is determined in the following step ST40 if it is a case of oversteer or understeer. This determination step may be based on the deviation between the standard yaw rate MYRNO and yaw rate YAWR, and is executed in the target wheel speed modification ratio computing unit RUDVR (O/U). Depending on the output of the target wheel speed modification ratio computing unit RUDVR which serves as means for detecting oversteer and understeer, the program flow advances to step ST41 in case of understeer or ST42 in case of oversteer.

In step ST41, the target vehicle speed modification decrement (the target vehicle speed modification ratio RUDVR)

which is computed in dependence on the degree of understeer is subtracted from the reference target wheel speeds (rolling direction speeds $VC_{mn}$) to yield the control target wheel speeds (vehicle momentum reduction control target vehicle speeds) $VI_{Rn}$. In step ST43 (see FIG. 15), the target control variable ($VE_{RR}/VE_{RL}$) for the inner wheel is computed from the deviation of the corresponding wheel speed ($VW_{RR}/VW_{RL}$) from the control target wheel speed $VI_{Rn}$. Likewise, in step ST44, the target control variable for the outer wheel is computed from the deviation ($VE_{RR}/VE_{RL}$) of the corresponding wheel speed ($VW_{RR}/VW_{RL}$) from the control target wheel speed $VI_{Rn}$.

The limiter value ILIN for the inner side is obtained from the tire lateral forces $CF_{mn}$, tire fore-and-aft forces $FX_{mn}$ and road surface frictional coefficient $\mu$ in step ST45 (see FIG. 17), and the limiter value ILOUT for the outer side is similarly obtained in step ST46.

When the program flow had advanced to step ST42 as a case of oversteer, the wheel control variables (target control variables) are computed in this step. The reference target wheel speeds (rolling direction speed $VC_{mn}$) are set as the control target wheel speeds (vehicle momentum reduction control target vehicle speeds) $VI_{Rn}$, and the target control variable ($VE_{RR}/VE_{RL}$) for each of the right and left rear wheels is computed from the deviation of the corresponding control target wheel speed $VI_{Rn}$ from the detected wheel speed of the corresponding rear wheel ($VW_{RR}/VW_{RL}$).

In step ST47, the limiter value ILTOT is obtained similarly as in the case of the understeer, and the program flow advances to step ST48. The program flow also advances from step ST46 to step ST48.

In step ST48, the upper limit of the rear wheel control variable is set by using the limiter value computed in step ST46 or ST47, and the rear wheel control variable (vehicle momentum reduction control variable) $IT_{Rn}$ which is limited within a prescribed range is obtained.

Step ST49 starts the process of computing a control variable by which the moment control based on the moment obtained from the vehicle body slip angle $\beta$ is restricted, in case of oversteer.

In step ST49, it is determined if the moment (vehicle body slip angle) control is in progress. It can be determined from the magnitude of the vehicle body slip angle $\beta$. If not, the program flow advances to step ST50 to determine if the condition to start the moment control is met. In step ST49, if the moment control is in progress, the program flow advances to step ST51 to start the process of determining if the condition to terminate the moment control is met.

In step ST50, it is determined if the process of estimating the steering angle STC has completed. If this estimation process has completed, the program flow advances to step ST52. Otherwise, the process of determining if the condition to start the moment control is met is terminated. In step ST52, it is determined if the estimated vehicle body speed VVβ is equal to or greater than a threshold value VVALST (20 km/h, for instance). If it is the case, the program flow advances to step ST53. In step ST53, it is determined if the tire slip angles $\alpha_{Rn}$ meet the condition for terminating the moment control. This condition is met when the absolute value of the tire slip angles $\alpha_{Rn}$ is equal to or greater than a threshold value ROTIN1 and the tire slip angle change rate Dα (degrees/sec) is equal to or greater than a threshold value DROTIN, or when the absolute value of the tire slip angles $\alpha_{Rn}$ is equal to or greater than a threshold value ROTIN2. If this condition is met, the program flow then advances to step ST54 (see FIG. 16).

In step ST54, it is determined if the vehicle body slip angle β and vehicle body slip angle increment Δβ meet the prescribed condition. This condition is met when the vehicle body slip angle β is equal to or greater than a threshold value β1 and the vehicle body slip angle change rate Dβ (degrees/sec) is equal to or greater than a threshold value Dβ or when the vehicle body slip angle β is equal to or greater than a threshold value β2(>β1). When this condition is met, the program advances to step ST55.

In step ST50, and steps ST52 to ST54, it is determined if the condition for starting the moment control is met. If it is determined in any of these steps that the condition for starting the moment control is not met, the current loop of the subroutine is terminated.

In step ST51, it is determined if the vehicle speed meets the prescribed condition for terminating the moment control. If the vehicle speed is equal to or lower than a lower speed limit (10 km/h, for instance), the current loop of the subroutine is terminated because the condition for terminating the moment control has been met. Otherwise, the program flow advances to step ST56 as a case of the condition not being met. In step ST56, it is determined if the vehicle slip angle and yaw rate have a same sign. If it is the case or they have a same sign, the program flow advances to step ST57.

In step ST57, it is determined if the tire slip angle condition has been met (indicating that a stable condition has been restored). If this condition is met, the program flow advances to step ST58. Otherwise, the program flow advances to step ST55. Also if the signs of the vehicle body slip angle and yaw rate differ from each other in step ST56, the program flow advances to step ST58.

In step ST58, it is determined if a delay time (200 ms, for instance, by elapsing of which the vehicle body slip angle control may be terminated) has expired. If the delay time has not expired, the program flow advances to step ST55 to continue the vehicle body slip angle control. Otherwise, the current loop of the subroutine is terminated.

Figure 16:
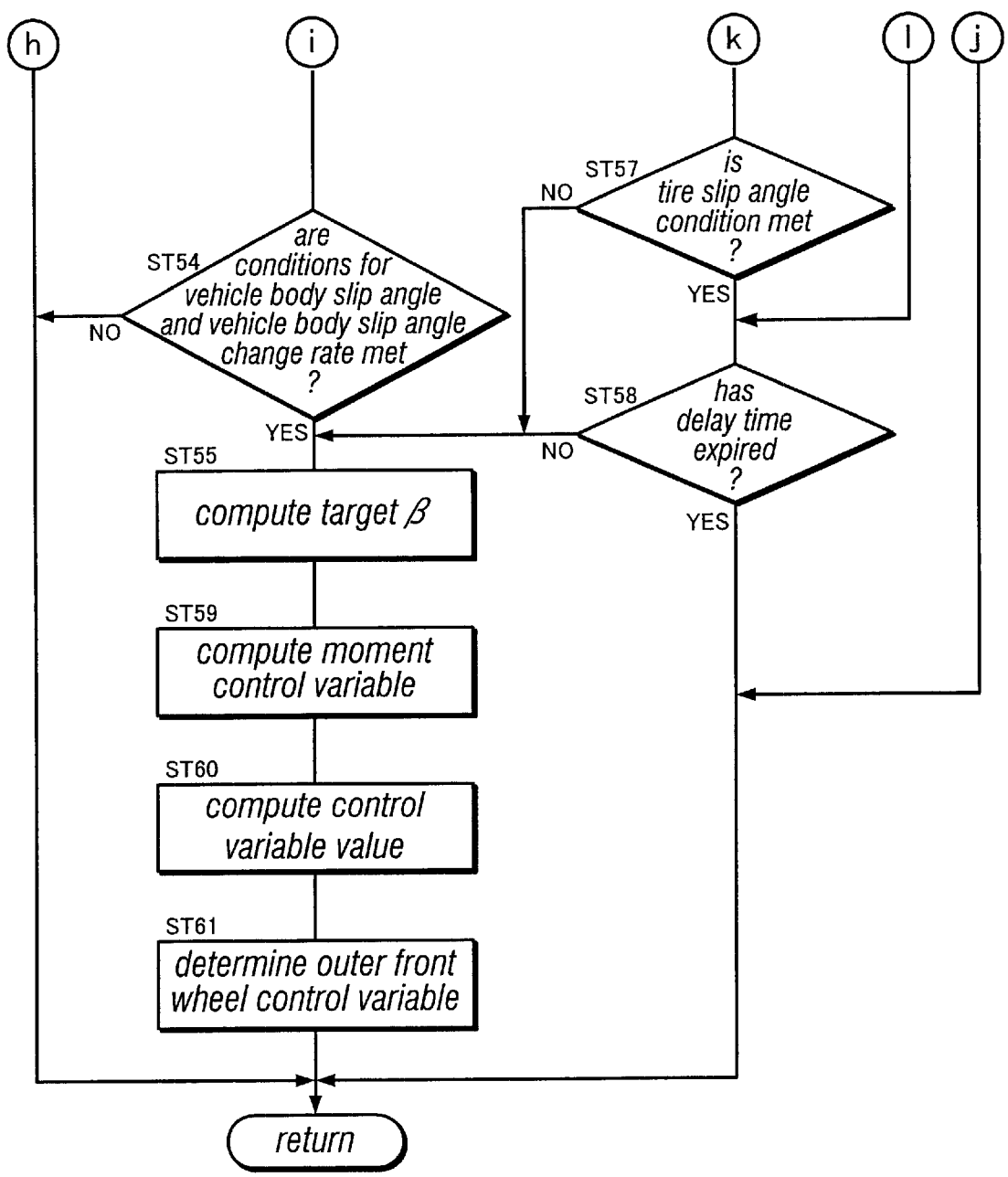
FIG. 16 is a third part of the subroutine flow chart for computing the degree of the vehicle momentum control.
Figure 17:
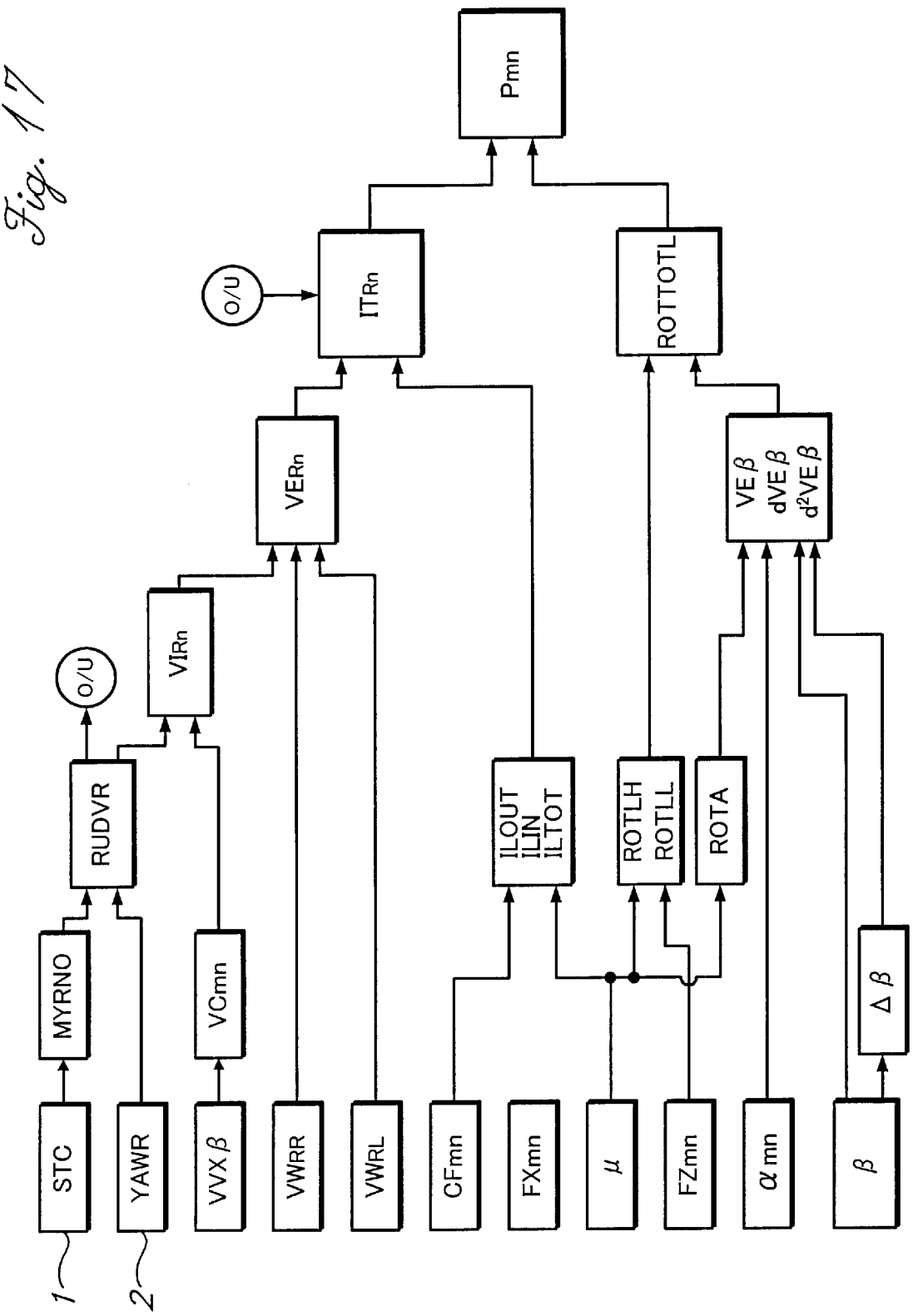
FIG. 17 is a block diagram showing the estimation logic for various control values in the vehicle motion control.

In step ST55, because the condition for the vehicle body slip angle has been met, the target vehicle body slip angle ROTA for this control is computed from the road surface frictional coefficient $\mu$ as shown in FIG. 16. In step ST59, the moment control variables (VEβ, dVEβ and $d^2$VEβ) are computed from the deviation between the target vehicle body slip angle ROTA and vehicle body slip angle β. Here, VEβ is a value obtained by subtracting the target vehicle body slip angle β (ROTALM) from the estimated vehicle body slip angle β, and indicates the deviation from the target vehicle body slip angle (limit angle). dVEβ is an increment (or a differential value) of this variable, and corresponds to the yaw rate when the target vehicle body slip angle β is a fixed value. $d^2$VEβ is a change rate of the change rate (a second order differential value of the deviation), and corresponds to the yaw rate increment when the target vehicle body slip angle β is a fixed value. In step ST60, the limiter values (ROTLH and ROTLL) of these control variables are computed according to the road surface frictional coefficient $\mu$ and wheel loads $FZ_{mn}$. In step ST61, the moment control variables (VEβ, dVEβ and $d^2$VEβ) are limited by the limiter values (ROTLH and ROTLL) and the outer front wheel control variable ROTTOTL is determined before this routine is terminated.

Depending on if oversteer or understeer is detected by the target wheel speed modification ratio computing unit RUDVR as well as the rear wheel control variable $IT_{Rn}$ and outer front wheel control variable ROTTOTL, the target hydraulic pressures of the four wheels for the brake control are determined in a target hydraulic pressure determining unit $P_{mn}$, and the corresponding brake forces of the four wheels are produced by a brake force control unit VEU. The target hydraulic pressure determining unit $P_{mn}$ and brake force control unit VEU jointly form the means for controlling the brake force which not only reduces the kinetic energy of the vehicle but also controls the vehicle body moment, and controls the drift out of the vehicle.

Figure 18:
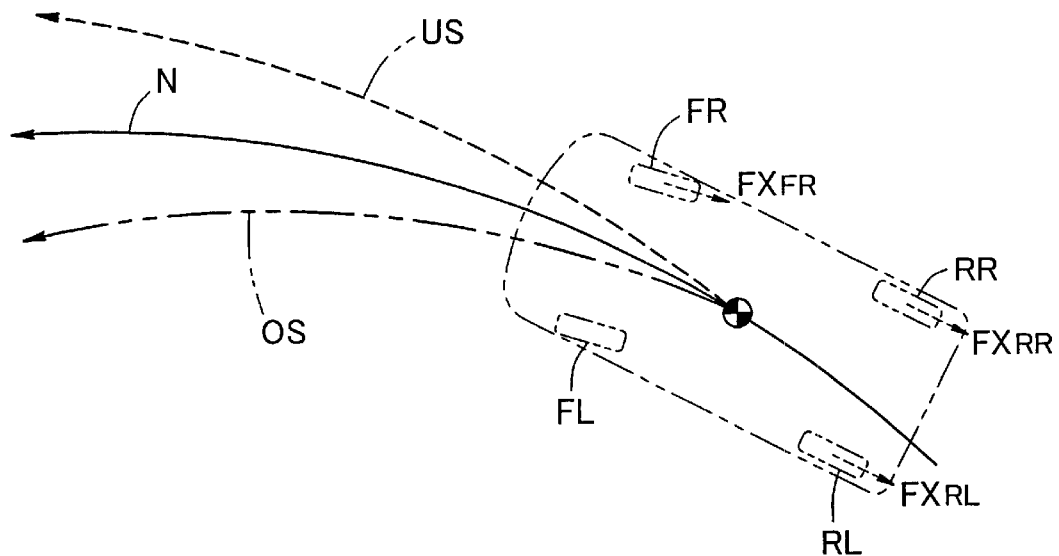
FIG. 18 is a diagram showing the control mode at the time of understeer/oversteer.

For instance, as shown in FIG. 18, when the neutral travel path of a vehicle turning a corner is given by the solid line arrow N in the drawing, the travel path would be given as indicated by the broken line arrow US in the case of understeer, and as indicated by the imaginary line arrow OS in the case of oversteer.

In the case of understeer, brake forces $FX_{RR}$ and $FX_{RL}$ are applied to the rear wheels RR and RL according to target hydraulic pressures $P_{RR}$ and $P_{RL}$ which are in turn determined according to the dynamic state of the vehicle and road surface condition as described above. This allows the vehicle (which otherwise has an understeer tendency) to travel along the neutral cornering path. In the case of oversteer, not only brake forces $FX_{RR}$ and $FX_{RL}$ are applied to the rear wheels RR and RL according to target hydraulic pressures $P_{RR}$ and $P_{RL}$ but also a brake force $FC_{FR}$ is applied to the outer front wheel (right front wheel FR in the illustrated embodiment) according to a target hydraulic pressures $P_{FR}$. This again allows the vehicle (which otherwise has an oversteer tendency) to travel along the neutral cornering path.

Thus, according to the foregoing embodiment, the sensor output and a corresponding estimated value are compared for each of the fore-and-aft acceleration and lateral acceleration, and the road surface frictional coefficient is obtained from these deviations. Therefore, the determination of the road surface frictional coefficient does not rely on the tire slip ratios, and can be accomplished in an accurate manner at all times.

In particular, when at least one of the deviations of the fore-and-aft acceleration and lateral acceleration continues to exists for more than a prescribed time period, it can be judged that the road surface frictional coefficient has undergone a sudden change. Even in such a case, the motion control of the vehicle can be continued according to a properly updated road surface frictional coefficient, and a favorable behavior of the vehicle can be maintained.

Although the present invention has been described in terms of a preferred embodiment thereof, it is obvious to a person skilled in the art that various alterations and modifications are possible without departing from the scope of the present invention which is set forth in the appended claims.

What is claimed is:

1. A system for computing a road surface frictional coefficient for controlling a motion of a vehicle, comprising:

a vehicle body fore-and-aft acceleration sensor for detecting a vehicle body fore-and-aft acceleration;

a vehicle body lateral acceleration sensor for detecting a vehicle body lateral acceleration;

a wheel speed sensor for detecting a road wheel speed;

a vehicle body speed estimating unit for computing a vehicle body speed according to the wheel speed;

a tire slip ratio computing unit for computing a tire slip ratio according to the vehicle body speed and wheel speed;

a tire model defining unit for defining a dynamic tire model;

a tire fore-and-aft force computing unit for computing tire fore-and-aft force according to the tire slip ratio and tire model;

an estimated vehicle body fore-and-aft acceleration computing unit for estimating the vehicle body fore-and-aft acceleration according to the tire fore-and-aft force;

a tire lateral force computing unit for computing a tire lateral force according to the tire slip ratio and tire model;

an estimated vehicle body lateral acceleration computing unit for estimating the vehicle body lateral acceleration according to the tire lateral force; and a road surface frictional coefficient computing unit for computing a road surface frictional coefficient according to at least one of a result of comparison between the detected vehicle body fore-and-aft acceleration and estimated vehicle body fore-and-aft acceleration, and a result of comparison between the detected vehicle body lateral acceleration and estimated vehicle body lateral acceleration.

2. A system for computing a road surface frictional coefficient according to claim 1, further comprising means for determining a sudden change in the road surface frictional coefficient.

* * * * *